US010645950B2

(12) United States Patent
Manchuliantsau et al.

(10) Patent No.: US 10,645,950 B2
(45) Date of Patent: May 12, 2020

(54) METHODS OF MANUFACTURING PRODUCTS FROM MATERIAL COMPRISING OILCAKE, COMPOSITIONS PRODUCED FROM MATERIALS COMPRISING PROCESSED OILCAKE, AND SYSTEMS FOR PROCESSING OILCAKE

(71) Applicant: USARIUM INC., Palo Alto, CA (US)

(72) Inventors: Aleh Manchuliantsau, Vitebsk (BY); Anastasia Tkacheva, Zelenograd (RU)

(73) Assignee: USARIUM INC., Palo Alto, CA (US)

( * ) Notice: Subject to any disclaimer, the term of this patent is extended or adjusted under 35 U.S.C. 154(b) by 0 days.

(21) Appl. No.: 16/671,342

(22) Filed: Nov. 1, 2019

(65) Prior Publication Data
US 2020/0060308 A1 Feb. 27, 2020

Related U.S. Application Data

(63) Continuation-in-part of application No. 16/285,223, filed on Feb. 26, 2019, which is a continuation-in-part of application No. 15/965,992, filed on Apr. 30, 2018.
(Continued)

(51) Int. Cl.
*A23J 1/14* (2006.01)
*A23J 1/00* (2006.01)
(Continued)

(52) U.S. Cl.
CPC ............... *A23J 1/005* (2013.01); *A23J 1/006* (2013.01); *A23J 3/14* (2013.01); *A23J 3/16* (2013.01);
(Continued)

(58) Field of Classification Search
CPC ............... A23L 5/10; A23L 5/20–5/25; A23L 25/00–25/40; A23L 31/00;
(Continued)

(56) References Cited

U.S. PATENT DOCUMENTS 2,162,729 A * 6/1939 Levinson ............... A23L 11/31
426/468
2,881,076 A * 4/1959 Sair ........................ A23J 1/14
426/634
(Continued)

FOREIGN PATENT DOCUMENTS

BY 10488 C1 4/2008
CA 968214 A 5/1975
(Continued)

OTHER PUBLICATIONS

ADM, Pro-Fam® 974, Isolated Soy Protein, 066-974, Jun. 26, 2008, 1 page.
(Continued)

*Primary Examiner* — Drew E Becker
(74) *Attorney, Agent, or Firm* — K&L Gates LLP

(57) ABSTRACT

Methods of manufacturing products from material comprising oilcake, compositions produced from materials comprising processed oilcake, and systems for processing oilcake are provided herein. The method comprises de-solubilizing protein in a material comprising oilcake to produce a processed material comprising an insoluble protein fraction. The processed material is hydrolyzed to produce a mixture comprising the insoluble protein fraction and a hydrolyzed fraction. The insoluble protein fraction is separated from the hydrolyzed fraction. The insoluble protein fraction is processed into a product.

18 Claims, 7 Drawing Sheets

Related U.S. Application Data

(60) Provisional application No. 62/905,472, filed on Sep. 25, 2019, provisional application No. 62/853,111, filed on May 27, 2019, provisional application No. 62/736,741, filed on Sep. 26, 2018, provisional application No. 62/713,251, filed on Aug. 1, 2018, provisional application No. 62/492,367, filed on May 1, 2017.

(51) Int. Cl.

| | | |
|---|---|---|
| *A23J 3/34* | (2006.01) | |
| *A23J 3/26* | (2006.01) | |
| *A23J 3/22* | (2006.01) | |
| *A23L 25/00* | (2016.01) | |
| *A23L 11/30* | (2016.01) | |
| *A23K 10/38* | (2016.01) | |
| *A23J 3/32* | (2006.01) | |
| *A23L 5/20* | (2016.01) | |
| *A23P 30/34* | (2016.01) | |
| *A23J 3/16* | (2006.01) | |
| *A23L 11/00* | (2016.01) | |
| *A23K 40/25* | (2016.01) | |
| *A23K 10/37* | (2016.01) | |
| *A23P 30/20* | (2016.01) | |
| *A23J 3/14* | (2006.01) | |

(52) U.S. Cl.
CPC ............... *A23J 3/227* (2013.01); *A23J 3/26* (2013.01); *A23J 3/32* (2013.01); *A23J 3/346* (2013.01); *A23J 3/348* (2013.01); *A23K 10/37* (2016.05); *A23K 10/38* (2016.05); *A23K 40/25* (2016.05); *A23L 5/21* (2016.08); *A23L 5/23* (2016.08); *A23L 5/25* (2016.08); *A23L 11/05* (2016.08); *A23L 11/07* (2016.08); *A23L 11/31* (2016.08); *A23L 11/32* (2016.08); *A23L 11/33* (2016.08); *A23L 25/30* (2016.08); *A23P 30/20* (2016.08); *A23P 30/34* (2016.08); *A23V 2200/262* (2013.01); *A23V 2200/264* (2013.01); *A23V 2250/548* (2013.01); *A23V 2250/5488* (2013.01); *A23V 2300/16* (2013.01); *A23V 2300/18* (2013.01); *A23V 2300/24* (2013.01); *A23V 2300/28* (2013.01)

(58) Field of Classification Search
CPC .......... A23L 11/05–11/07; A23L 11/30–11/33; A23L 25/30; A23P 30/20; A23P 30/30–30/38; A23K 10/30; A23K 10/37–10/38; A23K 40/20; A23K 40/25; A23J 1/005–1/006; A23J 3/14–3/16; A23J 3/26; A23J 3/30; A23J 3/34; A23J 3/346; A23J 3/348; A23J 3/32; A23V 2200/262–2200/264; A23V 2250/548; A23V 2250/5488; A23V 2300/16; A23V 2300/18; A23V 2300/24; A23V 2300/28
USPC .............. 426/31, 49, 52–54, 465, 472–473, 426/481–485, 516, 518–520, 802
See application file for complete search history.

(56) References Cited

U.S. PATENT DOCUMENTS

| | | | |
|---|---|---|---|
| 3,142,571 A | 7/1964 | Kitchel McAnelly et al. | |
| 3,527,642 A | 9/1970 | Harrison et al. | |
| 3,586,662 A | 6/1971 | O'Connor | |
| 3,723,131 A | 3/1973 | Bixby et al. | |
| 3,761,353 A * | 9/1973 | Noe | A23J 3/346 435/42 |
| 3,787,583 A | 1/1974 | Hruby | |
| 3,861,293 A * | 1/1975 | Buffa | C08B 30/16 99/484 |
| 3,891,774 A | 6/1975 | Baker et al. | |
| 3,904,769 A * | 9/1975 | Sair | A23J 3/26 426/104 |
| 3,908,025 A | 9/1975 | Miller | |
| 3,911,147 A | 10/1975 | Barham et al. | |
| 3,950,564 A | 4/1976 | Puski et al. | |
| 3,966,971 A * | 6/1976 | Morehouse | A23J 1/148 435/272 |
| 3,971,306 A | 7/1976 | Wiese et al. | |
| 4,088,795 A | 5/1978 | Goodnight, Jr. et al. | |
| 4,185,123 A * | 1/1980 | Wenger | A23J 3/227 426/272 |
| 4,212,799 A | 7/1980 | Nuzzolo et al. | |
| 4,310,558 A | 1/1982 | Nahm, Jr. | |
| 4,315,034 A * | 2/1982 | Levinson | A23J 3/22 426/104 |
| 4,423,082 A | 12/1983 | Bauernfeind et al. | |
| 4,435,319 A * | 3/1984 | Pearce | A23J 1/14 426/656 |
| 4,454,804 A | 6/1984 | McCulloch | |
| 4,505,936 A | 3/1985 | Meyers et al. | |
| 4,515,818 A * | 5/1985 | MacDonald | A23L 25/30 426/268 |
| 4,551,335 A | 11/1985 | Canella et al. | |
| 4,794,011 A * | 12/1988 | Schumacher | C11B 1/04 426/417 |
| 4,901,635 A | 2/1990 | Williams | |
| 4,937,085 A | 6/1990 | Cherry et al. | |
| 4,973,490 A | 11/1990 | Holmes | |
| 5,097,017 A | 3/1992 | Konwinski | |
| 5,270,062 A | 12/1993 | Buchs | |
| 5,296,253 A | 3/1994 | Lusas et al. | |
| 5,328,562 A | 7/1994 | Rafferty et al. | |
| 5,346,714 A | 9/1994 | Peters | |
| 5,391,384 A | 2/1995 | Mazza | |
| 5,436,023 A | 7/1995 | Avera | |
| 5,685,218 A * | 11/1997 | Kemper | B30B 9/127 100/37 |
| 5,702,746 A | 12/1997 | Wiik | |
| 5,725,902 A | 3/1998 | Lesueur-Brymer et al. | |
| 5,888,307 A | 3/1999 | Solheim | |
| 5,912,034 A | 6/1999 | Martin et al. | |
| 5,976,387 A | 11/1999 | Higo et al. | |
| 5,976,594 A | 11/1999 | LaFollette | |
| 6,039,999 A | 3/2000 | Bakshi et al. | |
| 6,045,851 A | 4/2000 | Cross | |
| 6,132,791 A | 10/2000 | Fox | |
| 6,165,349 A | 12/2000 | Madar | |
| 6,197,081 B1 | 3/2001 | Schmidt | |
| 6,534,105 B2 | 3/2003 | Kartchner | |
| 6,635,301 B1 * | 10/2003 | Howsam | A23J 3/227 426/574 |
| 6,800,308 B2 * | 10/2004 | Maenz | A23J 1/148 426/44 |
| 6,905,600 B2 | 6/2005 | Lee, Jr. | |
| 6,955,831 B2 | 10/2005 | Higgs et al. | |
| 7,575,771 B2 | 8/2009 | Ciantar et al. | |
| 7,771,699 B2 | 8/2010 | Adams et al. | |
| 7,932,065 B2 | 4/2011 | Medoff | |
| 7,968,760 B2 | 6/2011 | Lee, Jr. | |
| 7,989,011 B2 * | 8/2011 | Newkirk | A23J 1/14 426/489 |
| 7,989,592 B2 | 8/2011 | Ganjyal et al. | |
| 8,017,171 B2 | 9/2011 | Sample | |
| 8,017,820 B2 | 9/2011 | Foody et al. | |
| 8,048,652 B2 | 11/2011 | Fichtali et al. | |
| 8,057,639 B2 | 11/2011 | Pschorn et al. | |
| 8,133,393 B2 | 3/2012 | Stuart | |
| 8,192,769 B2 | 6/2012 | Wester et al. | |
| 8,278,081 B2 | 10/2012 | Schmidt | |
| 8,365,433 B2 | 2/2013 | Orura | |
| 8,372,464 B2 | 2/2013 | Dierking et al. | |
| 8,415,122 B2 | 4/2013 | Medoff et al. | |
| 8,481,677 B2 | 7/2013 | Barrows et al. | |
| 8,506,716 B2 | 8/2013 | Ahring et al. | |

(56) References Cited

U.S. PATENT DOCUMENTS

| | | | |
|---|---|---|---|
| 8,603,558 B1 | 12/2013 | Almutairi | |
| 8,642,109 B2 | 2/2014 | Baumer et al. | |
| 8,685,485 B2 | 4/2014 | McMindes et al. | |
| 8,728,542 B2* | 5/2014 | Pickardt | A23J 1/142 424/725 |
| 8,735,544 B1 | 5/2014 | Prevost et al. | |
| 8,820,328 B2 | 9/2014 | Ehling et al. | |
| 8,945,352 B2 | 2/2015 | Medoff | |
| 8,951,778 B2 | 2/2015 | Medoff et al. | |
| 8,986,774 B2 | 3/2015 | Ganjyal | |
| 9,084,948 B2 | 7/2015 | Mazza et al. | |
| 9,109,180 B2 | 8/2015 | Wolf et al. | |
| 9,125,962 B2 | 9/2015 | Michalek et al. | |
| 9,179,692 B2 | 11/2015 | Trass et al. | |
| 9,206,453 B2 | 12/2015 | Medoff et al. | |
| 9,259,017 B2 | 2/2016 | Dhalleine et al. | |
| 9,370,200 B2 | 6/2016 | Gibbons et al. | |
| 9,856,601 B2 | 1/2018 | Stromberg | |
| 9,878,355 B2 | 1/2018 | Norris et al. | |
| 10,039,306 B2 | 8/2018 | Vrljic et al. | |
| 10,172,380 B2 | 1/2019 | Varadan et al. | |
| 10,214,751 B2 | 2/2019 | Nilsen et al. | |
| 10,264,805 B2 | 4/2019 | Spinelli et al. | |
| 10,299,500 B2 | 5/2019 | Passe et al. | |
| 10,344,342 B2 | 7/2019 | Kusuda et al. | |
| 2002/0155206 A1 | 10/2002 | Orlando | |
| 2002/0174780 A1* | 11/2002 | Clifford | B30B 9/02 100/37 |
| 2003/0064145 A1 | 4/2003 | Fannon | |
| 2004/0067289 A1 | 4/2004 | Tricoit et al. | |
| 2004/0081742 A1 | 4/2004 | Levi et al. | |
| 2004/0185148 A1 | 9/2004 | Said | |
| 2004/0202771 A1 | 10/2004 | Lee | |
| 2004/0224065 A1 | 11/2004 | Markham et al. | |
| 2004/0237859 A1 | 12/2004 | Hartmann | |
| 2005/0095346 A1 | 5/2005 | Borders et al. | |
| 2005/0136162 A1* | 6/2005 | Kvist | C13B 20/002 426/455 |
| 2005/0249860 A1* | 11/2005 | Konecsni | A23L 29/206 426/622 |
| 2006/0040022 A1 | 2/2006 | Bouraoui | |
| 2006/0093718 A1 | 5/2006 | Jurkovich et al. | |
| 2006/0216397 A1 | 9/2006 | Kerkman | |
| 2007/0014896 A1 | 1/2007 | Wong et al. | |
| 2007/0087107 A1 | 4/2007 | Borders et al. | |
| 2007/0092616 A1 | 4/2007 | Witte et al. | |
| 2007/0172540 A1 | 7/2007 | Neece et al. | |
| 2007/0269580 A1 | 11/2007 | Werstak | |
| 2008/0008815 A1 | 1/2008 | Cho | |
| 2008/0008816 A1 | 1/2008 | Singh et al. | |
| 2008/0008817 A1 | 1/2008 | Singh et al. | |
| 2008/0008820 A1 | 1/2008 | Singh et al. | |
| 2008/0138495 A1 | 6/2008 | Barraclough et al. | |
| 2008/0160132 A1 | 7/2008 | Silver et al. | |
| 2008/0233266 A1 | 9/2008 | Boerboom | |
| 2009/0053800 A1 | 2/2009 | Friend et al. | |
| 2009/0155444 A1 | 6/2009 | Yakubu et al. | |
| 2009/0155447 A1 | 6/2009 | Moore et al. | |
| 2009/0155448 A1 | 6/2009 | Solorio et al. | |
| 2010/0021609 A1 | 1/2010 | Mattson et al. | |
| 2010/0112136 A1 | 5/2010 | Ward et al. | |
| 2010/0166940 A1 | 7/2010 | McMindes et al. | |
| 2010/0234569 A1* | 9/2010 | Helling | A23J 1/14 530/350 |
| 2011/0027433 A1 | 2/2011 | Ruf et al. | |
| 2011/0081689 A1 | 4/2011 | Flanegan et al. | |
| 2011/0172142 A1 | 7/2011 | Smith et al. | |
| 2011/0212239 A1 | 9/2011 | Carin et al. | |
| 2011/0309559 A1 | 12/2011 | Franke et al. | |
| 2011/0311599 A1 | 12/2011 | Boursier et al. | |
| 2012/0093994 A1 | 4/2012 | Hsieh et al. | |
| 2012/0171351 A1 | 7/2012 | Solorio | |
| 2012/0294986 A1 | 11/2012 | Choromanski et al. | |
| 2012/0301598 A1 | 11/2012 | Karges et al. | |
| 2013/0052682 A1 | 2/2013 | Medoff et al. | |
| 2013/0109065 A1 | 5/2013 | Godfroid et al. | |
| 2013/0243904 A1 | 9/2013 | Cordle et al. | |
| 2013/0287909 A1 | 10/2013 | Lewis et al. | |
| 2014/0088330 A1 | 3/2014 | Powell et al. | |
| 2014/0096764 A1 | 4/2014 | Komplin et al. | |
| 2014/0134316 A1 | 5/2014 | Jincks et al. | |
| 2014/0141127 A1 | 5/2014 | Jincks et al. | |
| 2014/0273140 A1 | 9/2014 | Langhauser | |
| 2014/0328984 A1* | 11/2014 | Legault | A23K 40/00 426/241 |
| 2015/0017312 A1* | 1/2015 | Tegel | A21D 2/183 426/622 |
| 2015/0041574 A1 | 2/2015 | Anderson | |
| 2015/0056324 A1 | 2/2015 | Cecava et al. | |
| 2015/0181957 A1 | 7/2015 | Baumer et al. | |
| 2015/0223498 A1 | 8/2015 | Gu et al. | |
| 2015/0250212 A1 | 9/2015 | Diaz et al. | |
| 2015/0367298 A1 | 12/2015 | Wenger | |
| 2016/0017444 A1 | 1/2016 | Medoff et al. | |
| 2016/0108187 A1 | 4/2016 | Wendeln et al. | |
| 2016/0143337 A1 | 5/2016 | Passe | |
| 2016/0295897 A1 | 10/2016 | Lis et al. | |
| 2016/0309743 A1 | 10/2016 | Spinelli et al. | |
| 2016/0360770 A1 | 12/2016 | Sherlock et al. | |
| 2017/0105438 A1 | 4/2017 | Ajami et al. | |
| 2017/0107447 A1* | 4/2017 | Hewitt | C11B 1/04 |
| 2017/0226439 A1 | 8/2017 | Nguyen et al. | |
| 2017/0226535 A1 | 8/2017 | Tudman | |
| 2017/0226695 A1 | 8/2017 | Rowlands et al. | |
| 2017/0280756 A1* | 10/2017 | Jaramillo Freydell | A23L 25/30 |
| 2017/0303558 A1 | 10/2017 | Eisner et al. | |
| 2018/0310590 A1 | 11/2018 | Manchuliantsau | |
| 2018/0327792 A1 | 11/2018 | Brown et al. | |
| 2019/0000120 A1 | 1/2019 | Hossen et al. | |
| 2019/0153122 A1 | 5/2019 | Mateus et al. | |
| 2019/0183155 A1 | 6/2019 | Manchuliantsau | |
| 2019/0223475 A1 | 7/2019 | Manchuliantsau et al. | |
| 2019/0223476 A1 | 7/2019 | Manchuliantsau et al. | |

FOREIGN PATENT DOCUMENTS

| | | |
|---|---|---|
| CA | 1177323 A | 11/1984 |
| EP | 0092443 A1 | 10/1983 |
| EP | 0455889 A1 | 3/1995 |
| EP | 2218497 A1 | 8/2010 |
| GB | 116357 A | 6/1918 |
| KR | 19930019123 A | 10/1993 |
| KR | 100248275 B1 | 3/2000 |
| KR | 100767809 B1 | 10/2007 |
| RU | 2297155 C2 | 4/2007 |
| RU | 2329658 C1 | 7/2008 |
| RU | 2406372 C1 | 12/2010 |
| WO | WO 2009/129320 A2 | 10/2009 |
| WO | WO 2009/134791 A2 | 11/2009 |
| WO | WO 2010/135679 A1 | 11/2010 |
| WO | WO 2011/107760 A2 | 9/2011 |
| WO | WO 2017/075078 A1 | 5/2017 |
| WO | WO 2019/102248 A1 | 5/2019 |

OTHER PUBLICATIONS

Da Graca Costa do Nascimento et al., "Use of sesame oil cake (*Sesamum indicum* L.) on corn expanded extrudates", Food Research International, 2012, vol. 45, pp. 434-443.

Sivaramakrishnan et al., "Chapter 13 Edible Oil Cakes", Biotechnology for Agro-Industrial Residues Utilisation, 2009, pp. 253-271.

Suknark et al., "Physical Properties of Directly Expanded Extrudates Formulated from Partially Defatted Peanut Flour and Different Types of Starch", Food Research International, 1997, vol. 30, No. 8, pp. 575-583.

Sokolowska et al., "Characteristics of rapeseed oilcake using nitrogen adsorption", International Agrophysics, 2013, 27, pp. 329-334.

Stein, "Nutritional Value of High Fiber Coproducts from the Copra, Palm Kernel, and Rice Industries in Diets Fed to Pigs", Journal of Animal Science and Biotechnology, 2015, vol. 6, No. 56, 9 pages.

(56) References Cited

OTHER PUBLICATIONS

Suttirak et al., "Potential Application of Ascorbic Acid, Citric Acid and Oxalic Acid for Browning Inhibition in Fresh-Cut Fruits and Vegetables", Walailak J Sci & Tech, 2010, vol. 7, No. 1, pp. 5-14.
McEvily et al., "Inhibition of Enzymatic Browning in Foods and Beverages", Critical Reviews in Food Science and Nutrition, 1992, vol. 32, No. 3, 253-273.
Narita et al., "Degradation Kinetics of Chlorogenic Acid at Various pH Values and Effects of Ascorbic Acid and Epigallocatechin Gallate on Its Stability under Alkaline Conditions", J. Agric. Food Chem., 2013, vol. 61, pp. 966-972.
Salgado et al., "Sunflower Protein Concentrates and Isolates Prepared from Oil Cakes Have High Water Solubility and Antioxidant Capacity", J Am Oil Chem Soc, 2011, 88, pp. 351-360.
Wong, Jacqueline, "Food Waste Diversion Options Analysis in Pomona, CA", A Thesis presented to the faculty of California State Polytechnic University, Pomona, 2018, 99 pages.
Bhatt et al., "From food waste to value-added surplus products (VASP): Consumer acceptance of a novel food product category", J Consumer Behav., 2017, pp. 1-7.
Pakhomova O.N., "Development and use of functional nutrition fortifier of rape oilcake", Thesis for application for academic degree of Ph.D., Orel, 2014.
Shepon et al., "Energy and protein feed-to-food conversion efficiencies in the US and potential food security gains from dietary changes", Environ. Res. Lett. 11, Oct. 2016, 8 pages.
International Search Report and Written Opinion of the International Searching Authority for International Application No. PCT/US2018/030084 dated Aug. 9, 2018.
Rodrigues et al., "increasing the Protein Content of Rapeseed Meal by Enzymatic Hydrolysis of Carbohydrates", BioResources, 9(2), pp. 2010-2025, 2010.
Brugger et al., "Next Generation Texturized Vegetable Proteins", Food Marketing & Technology, Apr. 2017, pp. 20-24.
Brookfield CT3, Texture Analyzer, Operating Instructions, Manual No. M08-372-C0113, Brookfield Engineering Laboratories, Inc., 56 pages.
Vestjens, Laura, MSc Thesis Biobased Chemistry and Technology, Sunflower-based protein fractions for food applications, Wageningen University & Research, Jul. 7, 2017.
Berk, Zeki, Chapter 6: Isolated Soybean Protein, Technology of Production of Edible Flours and Protein Products from Soybeans, FAO Agricultural Services Bulletin No. 97, http://www.fao.org/3/t0532e/t0532e07.htm.
Pakhomova O.N., "Development and use of a functional food fortifier from rapeseed cake", Thesis for application for academic degree of Ph.D., Orel, 2014. (English abstract included at p. 1—corresponds to Pakhomova O.N., "Development and use of functional rapeseed meal enrichment agent" as cited in the Dec. 5, 2019 International Search Report and Written Opinion of the ISA for International Application No. PCT/US2019/044258).
Deshpande et al., "Optimiation of a chocolate-flavored, peanut-soy beverage using response surface methodology (RSM) as applied to consumer acceptability data", Swiss Society of Food Science and Technology, 41, 2008, pp. 1485-1492.
Ren et al., "Isolation and Characterization of Sunflower Protein Isolates and Sunflower Globulins", Information Tech. and Agricultural Eng., AISC 134, 2012, pp. 441-449.
Perednya et al., "The Fodder Production's Extrusion Technologies", Vestnik NIIMZh Journal No. 4 (20), 2015, pp. 60-63. (English abstract included at p. 63—corresponds to Perednya V.I. et al. "Extrusion technology in feed production" as cited in the Dec. 5, 2019 International Search Report and Written Opinion of the ISA for International Application No. PCT/US2019/044258).
International Search Report and Written Opinion of the International Searching Authority for International Application No. PCT/US2019/044258 dated Dec. 5, 2019.
Andrianova E.N., "Chlorogenic Acid and Productivity of Broilers," All-Russian Research and Technological Poultry Institute (VNITIP), No. 9, 2015, pp. 17-21. (English abstract included at p. 17—corresponds to Andrianova cited in the Dec. 5, 2019 International Search Report and Written Opinion of the ISA for International Application No. PCT/US2019/044258).
Markov, S.A. et al., "Features of Fractions Chemical Compound of Sunflower Oilcakes and Meal at them Reagentless Division",Izvestiia VUZov. Pishchevaia Tekhnologiia, No. 1, 2012, pp. 29-31. (English abstract included at p. 31—corresponds to Markov S.A. et al., "Features of the chemical composition of fractions of sunflower meal and meal during their reagent-free separation" as cited in the Dec. 5, 2019 International Search Report and Written Opinion of the ISA for International Application No. PCT/US2019/044258).
Meal/WholeSeed Feeding, National Sunflower Association, accessed Feb. 20, 2020 from https://www.sunflowernsa.com/wholeseed/, 1 page.
Sunflower as a Feed, National Sunflower Association, accessed Feb. 20, 2020 from https://www.sunflowernsa.com/wholeseed/sunflower-as-a-feed/, 6 pages.
Sunflower Protein, AURI, Agricultural Utilization Research Institute, 2018, 2 pages.
Wildermuth, et al., "Chlorogenic Acid Oxidation and Its Reaction with Sunflower Proteins to Form Green-Colored Complexes", Comprehensive Reviews in Food Science and Food Safety, 2016, vol. 15, pp. 829-843.
ABC about PLANETARIANS, video aired Mar. 19, 2018, KSTP-TV, Minneapolis, MN, accessed from https://www.youtube.com/watch?v=5df9_0Wvnjl&feature=youtu.be.
"Planetarians Aiming to Fight Childhood Obesity with Food Waste", Sustainable Brands, Nov. 16, 2017, accessed from https://sustainablebrands.com/read/waste-not/planetarians-aiming-to-fight-childhood-obesity-with-food-waste, 5 pages.
Stone, Dawna, "Do Planetarians Sunflower Chips Have More Protein Than Beef?!", Bold Business, Feb. 27, 2018, accessed from https://www.boldbusiness.com/nutrition/planetarians-sunflower-chips-more-protein-beef/, 6 pages.
Feeding the Future, Successful Farming, Sep. 17, 2019, accessed from https://www.agriculture.com/news/business/feeding-the-future, 9 pages.
Today's Dietician, Great Valley Publishing Company, Inc., May 2018, vol. 20, No. 5, 69 pages.
Planetarians: "Animal Agriculture Cannot Feed the World", Oct. 26, 2018, vegconomist, accessed from https://vegconomist.com/interviews/planetarians-animal-agriculture-cannot-feed-the-world/, 8 pages.
Burwood-Taylor, Louisa, 2019 AgFunder AgriFood Tech Innovation Awards Winners Announced, AgFunder Network Partners, Mar. 21, 2019, accessed from https://agfundernews.com/2019-agfunder-innovation-awards-winners-announced.html, 4 pages.
Planetarians Sunflower Chips, National Sunflower Association, Dec. 1, 2018, accessed from https://www.sunflowernsa.com/magazine/articles/default.aspx?ArticleID=3822, 4 pages.
Askew, Katy, "Planetarians ties-up with Barilla, Amadori to innovate with up-cycled sunflower flour", Mar. 19, 2019, FoodNavigator.com, accessed from https://www.foodnavigator.com/Article/2019/03/19/Planetarians-ties-up-with-Barilla-Amadori-to-innovate-with-up-cycled-sunflower-flour?utm_source=copyright&utm_medium=OnSite&utm_campaign=copyright, 5 pages.
Murray, Sarah, "Accelerators speed development of promising food start-ups", Financial Times, Mar. 11, 2019, accessed from https://www.ft.com/content/778c9f5e-294e-11e9-9222-7024d72222bc, 4 pages.
Peters, Adele, "Everything you need to know about the booming business of fighting food waste", Jun. 19, 2019, accessed from https://www.fastcompany.com/90337075/inside-the-booming-business-of-fighting-food-waste, 7 pages.

\* cited by examiner

METHODS OF MANUFACTURING PRODUCTS FROM MATERIAL COMPRISING OILCAKE, COMPOSITIONS PRODUCED FROM MATERIALS COMPRISING PROCESSED OILCAKE, AND SYSTEMS FOR PROCESSING OILCAKE

CROSS-REFERENCE

This application claims priority to U.S. Provisional Patent Application No. 62/905,472, which was filed on Sep. 25, 2019, U.S. Provisional Patent Application No. 62/853,111, which was filed on May 27, 2019, and is a continuation-in-part of U.S. patent application Ser. No. 16/285,223, filed on Feb. 26, 2019, which claims priority to U.S. Provisional Patent Application No. 62/736,741, filed on Sep. 26, 2018, and U.S. Provisional Patent Application No. 62/713,251, filed on Aug. 1, 2018, and is a continuation-in-part of U.S. patent application Ser. No. 15/965,992, filed on Apr. 30, 2018, which claims priority to U.S. Provisional Patent Application No. 62/492,367, filed on May 1, 2017. The contents of which are incorporated by reference into this specification.

FIELD

The present disclosure relates to methods of manufacturing products from material comprising oilcake, compositions produced from materials comprising processed oilcake, and systems for processing oilcake.

BACKGROUND

Manufacturing of plant-based materials can lead to various byproducts that may be unsuitable for a desired application. For example, pressing oilseeds to extract oil can produce a byproduct of oilcake that may not be suitable for human food products and may require remediation. There are challenges with remediation of byproducts.

SUMMARY

According to one aspect of the present disclosure, a method is provided. The method comprises de-solubilizing protein in a material comprising oilcake to produce a processed material comprising an insoluble protein fraction. The processed material is hydrolyzed to produce a mixture comprising the insoluble protein fraction and a hydrolyzed fraction. The insoluble protein fraction is separated from the hydrolyzed fraction. The insoluble protein fraction is processed into a product.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this disclosure.

BRIEF DESCRIPTION OF THE DRAWINGS

The features and advantages of the examples, and the manner of attaining them, will become more apparent, and the examples will be better understood, by reference to the following description of embodiments taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1:
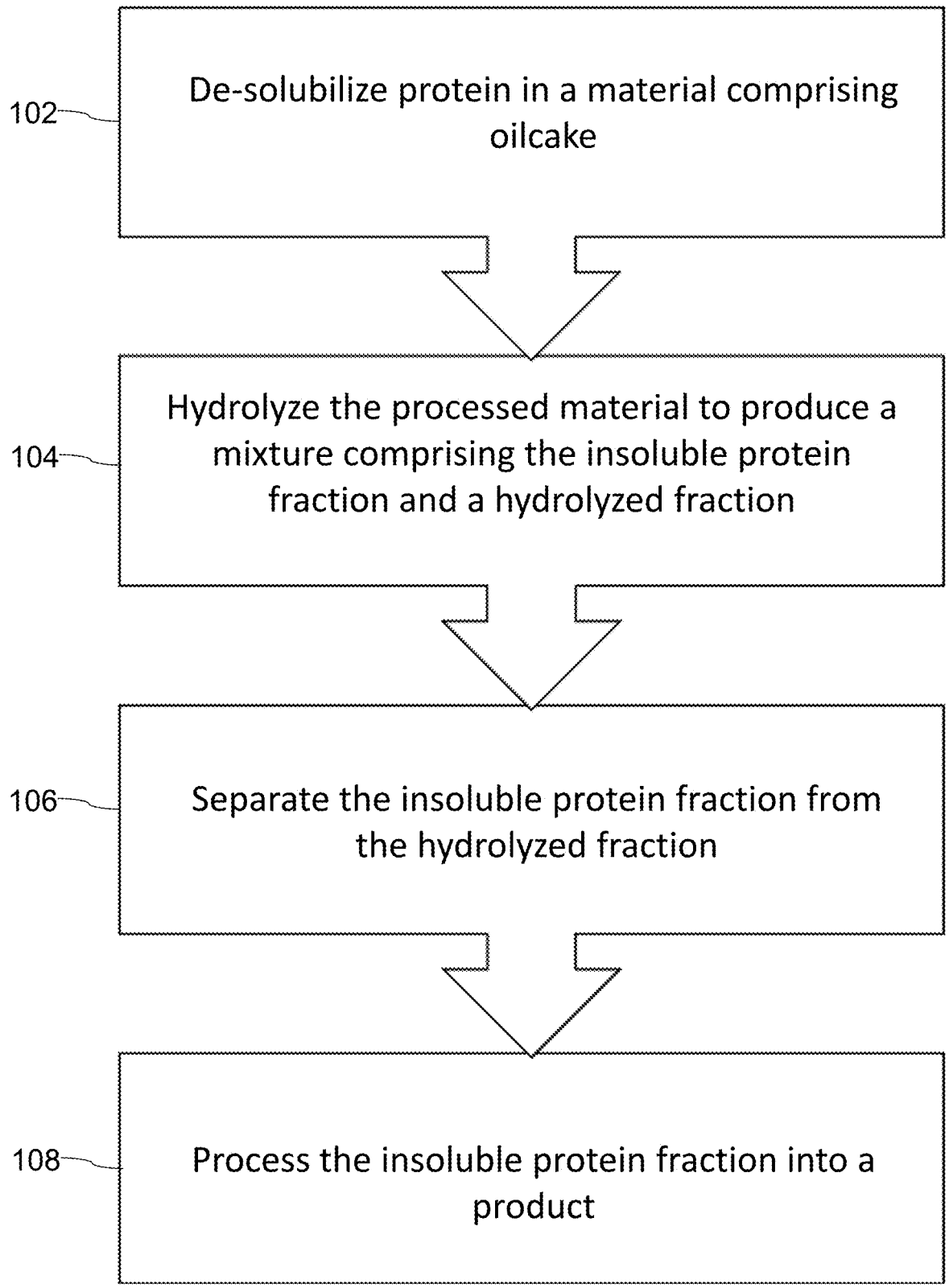
FIG. 1 is a flow chart of a method to process a raw material comprising oilcake to produce a product according to the present disclosure.

Various examples are described and illustrated herein to provide an overall understanding of the structure, function, and use of the disclosed methods, systems, compositions, and products. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various examples disclosed and described in this specification can comprise, consist of, or consist essentially of the features and characteristics as variously described herein.

Any patent, publication, or other disclosure material identified herein is incorporated herein by reference in its entirety unless otherwise indicated but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout the specification to "various examples," "some examples," "one example," or "an example", or the like, means that a particular feature, structure, or characteristic described in connection with the example is included in at least one example. Thus, appearances of the phrases "in various examples," "in some examples," "in one example", or "in an example", or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

All ranges recited herein are inclusive of the end points of the recited ranges. For example, a range of "1 to 10" includes the end points 1 and 10. Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

In this specification, unless otherwise indicated, all percentages (e.g., weight percent protein, percent protein, percent moisture) are to be understood as being based on weight.

As used herein, the term "water soluble" means the substance has a solubility of at least 0.1 grams per 100 mL of water at 25 degrees Celsius and 1 atmosphere of pressure.

As used herein, the term "water insoluble" means the substance has a solubility of less than 0.1 grams per 100 mL of water at 25 degrees Celsius and 1 atmosphere of pressure Meat analogs can comprise at least one of a textured protein, a high moisture meat analog (HMMA), or a texturized vegetable protein (TVP), or any combinations thereof. HMMA are typically produced by high moisture extrusion cooking and can have a high final moisture content, such as, for example, 50 percent to 80 percent moisture by total weight of the HMMA. Some HMMAs may have a limited shelf life and require cold storage. TVP is typically produced by a lower moisture process than HMMA (e.g., less than 30 percent added moisture) and dried down to 8 percent moisture based on the total weight of the TVP. TVPs are typically marketed as a shelf stable product which requires rehydration before consumption. HMMA can be produced from TVP by adding additional moisture.

Producing meat-like puffed products from soy meal by extrusion for raw ingredients with at least 30 percent protein based on the dry weight of the raw ingredients may require that the raw ingredients do not comprise greater than 40 percent carbohydrates based on the dry weight of the raw ingredients. For example, see Canadian Patent No. 968214A to Jenkins et al. However, the inventors of the present disclosure determined that for sunflower oilcake, which typically can comprise 30-40 percent protein based on the dry weight of the sunflower oilcake and 45 percent carbohydrates based on the dry weight of the sunflower oilcake, processing the sunflower oilcake by extrusion alone can result in an undesirable mushy texture, which is unsuitable for a meat analog. The undesirable mushy texture can be a result of the high carbohydrate content on the raw ingredients.

Sunflower protein can be expensive to process require extra ingredients and extra washing steps. For example, See "Next Generation Texturized Vegetable Proteins" by Brugger et al. *Food Marketing & Technology* (April 2017). Additionally, producing protein isolates and concentrates by first solubilizing and then precipitating proteins can cause a high loss of protein content, undesirable chemical modification of the proteins, loss of nutritional value, and undesirable changes in the amino acid composition of the protein. See, for example, Chapter 6: Isolated Soybean Protein, TECHNOLOGY OF PRODUCTION OF EDIBLE FLOURS AND PROTEIN PRODUCTS FROM SOYBEANS, by Zeki Berk, FAO Agricultural Services Bulletin No. 97, available at http://www.fao.org/3/t0532e/ t0532e07.htm. Additionally, U.S. Pat. No. 4,315,034 to Levinson et al. discloses an undesirable solubilization process that may not be applicable for meat analogs made from sunflower oilcake since they would have an undesirable texture. Further, the inventors of the present disclosure discovered that protein isolation from sunflower oilcake can be hindered due to gel formation during the membrane filtration processes, which can lead to even higher protein losses (e.g., greater than 25) that results in high costs to process the sunflower oilcake and undesirable textures of the final product. See also U.S. Pat. No. 5,097,017 to Konwinski; Russian Patent No. 2,406,372; U.S. Pat. No. 3,142,571 to Kitchel; U.S. Pat. No. 3,950,564 to Puski et al., which may lead to an undesirable taste and/or an undesirable texture. Additionally, enzymatic hydrolysis of rapeseed meal was disclosed in "Increasing the Protein Content of Rapeseed Meal by Enzymatic Hydrolysis of Carbohydrates" by Rodrigues et al. BioResources Vol. 9 No. 2 (2014) available at https://ojs.cnr.ncsu.edu/index.php/BioRes/article/view/BioRes_09_2_2010_Rodrigues_Protein_Rapeseed_Meal/2626, however the inventors of the present disclosure discovered that the protein losses and texture of Rodrigues may be undesirable.

The inventors of the present disclosure determined that the conventional ways of processing oilcake into a product comprising a high protein content can lead to undesired chemical reactions that make the oilcake less suitable for human consumption. For example, excessive heating steps, organic solvents, and extreme acidic conditions used in processing oilcake can lead to a reduction in nutritional value of and digestibility of oilcakes. Additionally, these processing steps can lead to a toxicity in the oilcake that is unsuitable for human consumption. Accordingly, methods of manufacturing products from material comprising oilcake, compositions produced from materials comprising processed oilcake, and systems for processing oilcake are provided that can be suitable for human consumption are provided.

The present disclosure can utilize a raw material comprising oilcake. The oilcake can be a byproduct of oil extraction from oilseeds. For example, oil can be extracted from oilseeds by mechanical pressing, such as, for example, screw pressing, and the dry matter left after the mechanical pressing can be the oilcake. The oilcake can comprise at least one of a sunflower oilcake, a soybean oilcake, a cottonseed oilcake, a rapeseed oilcake, a canola oilcake, a copra oilcake, a palm kernel oilcake, a peanut oilcake, an olive oilcake, or a locust bean cake, or any combination thereof. For example, the oilcake can comprise sunflower oilcake.

The oilcake may be produced from dehulled oilseeds or from oilseeds that were not dehulled. Leaving the hulls on the oilseeds can affect the fiber content of the oilcake and the texture of a product produced therefrom. Leaving the hulls on the oilseeds during pressing may be desirable as it can increase the oil extraction yield during pressing of the oilseeds and reduce energy costs when processing the oilseeds. However, the fiber content of the oilseeds with hulls can affect the texture of a product produced from the oilseeds with hulls. The methods of manufacturing products from material comprising oilcake, compositions produced from materials comprising processed oilcake, and systems for processing oilcake of the present disclosure can utilize a raw material comprising oilcake produced from oilseeds with hulls and achieve a desirable product. For example, de-solubilizing protein, hydrolyzing fibers, and/or limiting use of undesirable chemicals can produce a product with a desirable texture and/or taste and reduce the cost to produce the product.

Referring to FIG. 1, a flow chart illustrating a method for processing a raw material comprising oilcake into a product is provided. The method comprises de-solubilizing protein in the raw material to produce a processed material comprising an insoluble protein fraction, 102. For example, the de-solubilizing at step 102 can decrease the solubility of the protein in the raw material such that the insoluble protein fraction can be less soluble than protein present in the raw material prior to de-solubilizing at step 102. In various examples, the insoluble protein fraction can be water insoluble.

In various examples, the raw material can comprise at least 25 percent protein based on the dry weight of the raw material, such as, for example, at least 30 percent protein, at least 35 percent protein, at least 40 percent protein, at least 45 percent protein, at least 50 percent protein, or at least 55 percent protein based on the dry weight of the raw material. In certain examples, the oilcake can comprise no greater than 60 percent protein based on the dry weight of the raw material, such as, for example, no greater than 55 percent protein, no greater than 50 percent protein, no greater than 45 percent protein, no greater than 40 percent protein, no greater than 35 percent protein, or no greater than 30 percent protein based on the dry weight of the raw material. For example, the raw material can comprise a range of 25 percent to 60 percent of protein based on the dry weight of the raw material, such as, for example, 30 percent to 50 percent protein or 30 percent to 40 percent protein based on the dry weight of the raw material.

In certain examples, the raw material can comprise at least 25 percent carbohydrates based on the dry weight of the raw material, such as, for example, at least 30 percent carbohydrates, at least 35 percent carbohydrates, at least 40 percent carbohydrates, or at least 45 percent carbohydrates based on the dry weight of the raw material.

The raw material can also comprise, in addition to the oilcake, at least one of a distiller grain, pulp, a pomace, a legume, a mushroom, or a microbial protein (e.g., biomass or protein extract from algae, yeast, fungi, or bacteria), or any combination thereof. The pulp can comprise at least one of sugarcane pulp or sugar beet pulp or any combination thereof. The distiller's grain can comprise at least one of wheat, corn or barley which was used in a fermentation process or any combination thereof. The distiller's grain can be with and/or without solubles (DDGS and/or DDG). The pomace can comprise at least one of fruit pomace or vegetable pomace or any combination thereof. For example, the pomace can comprise tomato pomace. The legume can comprise at least one of a pea, a chickpea, or a mung bean, or any combination thereof. For example, the raw material can also comprise a vegetable waste material, such as, for example, at least one of a nut shell waste, nut hulls, nut pomace, fruit peels, fruit pomace, fruit pulp, whole defective fruits, vegetable peels, vegetable pomace, vegetable pulp, whole defective vegetables, coffee pulp, spent coffee grounds, bean skins, bean pods, whole defective beans, spent brew grains, distiller dried grains and solids, yeast waste, cereal hulls, cereal bran, defective mushrooms, small species, sugar beets pulp, or sugar beet molasses, or any combination thereof.

The protein content of the raw material can affect the properties of a product produced therefrom. In various examples, the carbohydrate content (e.g., starch content, fiber content, and sugar content) of the raw material can affect the properties of a product produced therefrom. Optimizing the composition of the raw material can improve the protein quality (e.g., amino acid composition, digestibility), micro-structure, absorption properties (e.g., water absorption, fat absorption), texture, taste, aftertaste, shelf life, and color of the final product. For example, including mushrooms in the raw material can improve the flavor and texture of a product produced from the raw material. Additionally, the amount of oilcake in the raw material can be chosen to achieve a desirable protein content in a product formed therefrom.

The protein content, starch content, and fiber content of various oilcakes/byproducts that may be included in the raw material are provided in Table 1 below.

TABLE 1

Oilcake/byproduct compositions

| Raw Material | Protein (dry weight percent) | Carbohydrates (dry weight percent) | Starch (dry weight percent) | Fiber (dry weight percent) |
|---|---|---|---|---|
| Soy oilcake | 43-53 | 40 | 2-6 | 6-7 |
| Sunflower oilcake | 30-40 | 45 | 4.2 | 18-35 |
| Rape seeds oilcake | 30-40 | 39 | 0.5 | 11-14 |
| Cottonseeds oilcake | 30-40 | 38 | 3.3 | 12-25 |
| Distillers dried grains (corn) | 30 | 52-55 | 5.1 | 9-14 |
| Sugar beets pulp | 7-12 | 38-50 | 0.5 | 20-25 |
| Tomato pomace | 10-20 | 78 | 3.7 | 40-69 |

In various examples, the raw material can comprise at least 5 percent oilcake based on the total weight of the raw material, such as, for example, at least 10 percent oilcake, at least 20 percent oilcake, at least 30 percent oilcake, at least 40 percent oilcake, at least 50 percent oilcake, at least 60 percent oilcake, at least 70 percent oilcake, at least 80 percent oilcake, at least 90 percent oilcake, or at least 95 percent oilcake based on the total weight of the raw material. In certain examples, the raw material can comprise no greater than 100 percent oilcake based on the total weight of the raw material, such as, for example, no greater than 95 percent oilcake, no greater than 90 percent oilcake, no greater than 80 percent oilcake, no greater than 70 percent oilcake, no greater than 60 percent oilcake, no greater than 50 percent oilcake, no greater than 40 percent oilcake, no greater than 30 percent oilcake, no greater than 20 percent oilcake, or no greater than 10 percent oilcake based on the total weight of the raw material. For example, the raw material can comprise a range of 5 percent to 100 percent oilcake based on the total weight of the raw material, such as, for example, 30 percent to 100 percent oilcake, 20 percent to 50 percent oilcake, or 50 percent to 90 percent oilcake based on the total weight of the raw material.

De-solubilizing the raw material at step 102 can comprise at least one of extruding the raw material, toasting the raw material, drying the raw material, adding salt to the raw material, adjusting the pH of the raw material, or another method to decrease the solubility of protein in the raw material, or any combination thereof. In various examples, de-solubilizing the raw material at step 102 can comprise extruding the raw material.

The water solubility of protein may depend on the tertiary structure of the protein. For example, globular proteins can be water soluble and fibrous proteins can be water insoluble. Globular proteins can be spherical and can be structured such that more hydrophilic amino acids within the globular protein have a stronger interaction with the surrounding environment than hydrophobic amino acids within the globular protein, thereby resulting in a hydrophilic nature of the globular protein (e.g., water solubility).

De-solubilizing at step 102 can denature the globular proteins by changing the tertiary structure (e.g., folding, positioning of amino acids) of the globular protein, thereby reducing the water solubility of the resulting denatured protein. The denatured protein may be water insoluble and may be considered a fibrous protein (e.g., comprising an elongated structured compared to the globular protein). For example, sunflower oilcake can comprise water soluble proteins, such as, 11-S globulins and 2-S albumins, among others. Exposing 11-S globulins and 2-S albumins to a temperature of 70 degrees Celsius or greater and/or an extrusion process can denature the 11-S globulins and 2-S albumins by changing the tertiary structure of the proteins (e.g., unfolded, elongated), thereby decreasing their water solubility. The resulting denatured 11-S globulins and denatured 2-S albumins may be less soluble in water than prior to denaturing. For example, the denatured 11-S globulins and denatured 2-S albumins may be water insoluble and may be considered fibrous proteins.

In examples where de-solubilizing at step 102 comprises extrusion, the tertiary structure of the proteins can be unfolded and thereafter re-associated into larger and fibrous protein chains. For example, hydrogen bonds in the proteins can be disrupted during the denaturation process at low moisture content. Thereafter, the hydrogen bonds can be recreated between different protein molecules, and formation of bonds between water and protein molecules can be limited, which can lead to an increase in the size of the protein chains (e.g., aggregation, de-solubilization). Extrusion can result in the formation of aggregates, which can be stabilized by non-covalent and disulfide linkages (e.g., formed due to increased pressure during extrusion). The formed protein aggregates can be water insoluble.

The raw material can be pre-processed prior to the processing step 102. Pre-processing of the raw material can comprise at least one of mixing, grinding, milling, fractionating (e.g., screening, air classification), cutting, anti-nutrient neutralization, and moisturizing. For example, pre-processing can comprise milling and fractionating, which can increase the protein content of the raw material. For example, the milling and fractionating can separate the hulls from the kernels in the oilcake, which produces a protein-rich fraction (e.g., greater than 43.5 percent of dry weight of the protein in the raw material) that can be used as the raw material and a protein deficient fraction (e.g., less protein than the protein rich fraction) that can be utilized in a different process and/or discarded. The milling and fractionating can increase the protein content in the raw material by at least 5 percent based on the dry weight of the raw material, such as, for example, by at least 10 percent, by at least 15 percent, by at least 20 percent, by at least 30 percent, by at least 40 percent, or by at least 50 percent based on the dry weight of the raw material. The milling and fractionating can be performed utilizing an air classification mill. In various examples, the raw material can be screened to remove a first fiber fraction, milled into finer particles, and then fractionated to remove a protein-deficient fraction, leaving a protein-rich fraction for further processing at step 102.

The oilcake can also comprise carbohydrates, such as, for example, cellulose, hemicellulose, lignin, and starch. In various examples, a high carbohydrate content and a low protein content in the raw material may result in a product with an undesired texture. Thus, it may be desirable to lower the carbohydrate content in the raw material and increase the protein content in the raw material.

The method can comprise hydrolyzing the processed material to produce a mixture comprising the insoluble protein fraction and a hydrolyzed fraction, 104. The hydrolyzed fraction can comprise hydrolyzed carbohydrates, ash, fats, and soluble nutrients. Producing the mixture can enable more facile separation of the insoluble protein fraction from the hydrolyzed fraction. For example, the hydrolyzed fraction may be water soluble, and thus, the mixture can be phase separated. In various examples, the insoluble protein fraction can be denatured and further textured into fibrous proteins (e.g., elongated) such that the insoluble protein fraction can be configured to precipitate out of the mixture.

Hydrolyzing at step 104 can comprise at least one of adding an enzyme to the raw material or adding an acid to the raw material or any combination thereof. The temperature, pressure, residence time, pH of the mixture, and/or other additives to the mixture can be selected based on the enzymes utilized for hydrolysis while balancing costs and efficiencies. In various examples, at least one of moisture, buffer, or a pH adjustment agent, or any combination thereof can be added to the mixture to facilitate the hydrolysis. The pH adjustment agent can be at least one of an acid, a base, and a neutralizer. In various examples, water is added to the mixture at a ratio in a range of 1 part of mixture: 6 parts of water to 1 part of mixture: 2 parts of water, such as, for example, 1 part of mixture: 4.5 parts of water to 1 part of mixture: 2.5 parts of water or 1 part of mixture: 4 parts of water to 1 part of mixture: 2 parts of water.

The enzyme can comprise at least one of cellulase, alpha-galactosidase, xylanase, glucanase, amylase, liginase, transglutaminase, endoglucanase, or hemicellulase, or any combination thereof. The enzyme can comprise an activity in a activity range of 1 unit/gram (u/g) to 1000 u/g, such as, for example, 10 u/g to 100 u/g or 10 u/g to 50 u/g. In various examples, the enzyme can be added such that the mixture can comprise at least 0.1 percent of enzyme based on the total weight of the mixture, such as, for example, at least 1 percent of enzyme, at least 2 percent of enzyme, or at least 5 percent of enzyme based on the total weight of the mixture. In certain examples, the enzyme can be added such that the mixture can comprise no greater than 10 percent of enzyme based on the total weight of the mixture, such as, for example, no greater than 5 percent of enzyme, no greater than 2 percent of enzyme, or no greater than 1 percent of enzyme based on the total weight of the mixture. For example, the enzyme can be added such that the mixture can comprise a range of 1 percent to 10 percent of enzyme based on the total weight of the mixture, such as, for example, 1 percent to 5 percent of enzyme or 2 percent to 5 percent of enzyme based on the total weight of the mixture. The enzyme can be added as an enzyme solution.

In various examples, the enzymes can decrease the water solubility of the insoluble protein fraction and create protein conglomerates (e.g., cross-link proteins). For example, cellulose and transglutaminase can be added to the mixture. The cellulose can liquefy and/or otherwise increase the water solubility of carbohydrates while the transglutaminase can cross-link proteins to make protein conglomerates, which can decrease the solubility of the proteins.

The mixture can be contacted with the enzymes for a residence time in a range of 1 hour (hr) to 48 hrs, such as, for example, 1 hr to 24 hrs, 2 hrs to 24 hrs, 2 hrs to 6 hrs, or 2 hrs to 4 hrs. The temperature of the mixture can be selected to control enzyme activity. For example, the mixture can be adjusted to a temperature in a range of 30 degrees Celsius to 60 degrees Celsius, such as, for example, 30 degrees Celsius to 60 degrees Celsius, 30 degrees Celsius to 40 degrees Celsius, or 40 degrees Celsius to 60 degrees Celsius. The pH of the mixture can be selected to control enzyme activity. For example, the pH of the mixture can adjusted to a pH range of 4 to 9, such as, for example, 4 to 8, 4 to 7, 4 to 6, 4 to 5, or 4.5 to 5. In various examples, enzyme can be added to the raw material, and the raw material can be hydrolyzed in a vessel (e.g., a bioreactor) by the enzyme.

The method can comprise separating the insoluble protein fraction from the hydrolyzed fraction, 106. For example, separating can comprise at least one of centrifuging the mixture, decanting the mixture, or precipitating the protein fraction from the mixture, or any combination thereof.

Precipitating the protein fraction can comprise adjusting a pH of the mixture. For example, the pH of the mixture can be adjusted to the isoelectric point (pI) of the mixture to facilitate precipitation of the protein fraction. The pI is the pH of a solution at which the net charge of a protein becomes zero. At the pI, the solubility of the insoluble protein fraction can decrease such that the insoluble protein fraction is even less soluble in water and the insoluble protein fraction can precipitate out of solution.

For example, proteins in sunflower oilcake can comprise multiple pIs, such as, for example, a pI of 4.1 (water soluble proteins), 5.4 (salt soluble proteins), and 5.6 (protein isolate). Thus, to precipitate a protein fraction from mixture comprising sunflower oilcake, the protein can be adjusted to one of three pIs for sunflower oilcake to precipitate a particular type of protein and/or the pH of the solution can be adjusted to pass through at least two of the pIs, thereby precipitating at least two types of proteins.

The insoluble protein fraction after step 106 can be comprise a range of 30 percent to 80 percent moisture based on the total weight of the insoluble protein fraction, such as, for example, 40 percent to 70 percent moisture or 50 percent to 70 percent moisture based on the total weight of the insoluble protein fraction. In various examples, the moisture content of the insoluble protein fraction can be adjusted after step 106. For example, the protein fraction can be dried (e.g., heated, spray dried), extruded (e.g., in step 108), mixed with other ingredients, or moisture can be added to the protein fraction.

The method according to the present disclosure can comprise processing the insoluble protein fraction into a product, 108. The processing at step 108 can comprise at least one of extruding, drying (e.g., heating, spray drying), or fractionating, or any combination thereof, the insoluble protein fraction. For example, the processing at step 108 can comprise extruding the insoluble protein fraction, such as, for example wet extruding the protein fraction which can comprise adding moisture until the resulting wet mixture comprises at least 40 percent moisture by total weight of the wet mixture. In various examples comprising extruding the protein fraction, the protein fraction can be processed directly into a product (e.g., a HMMA) without a drying step thereafter which can save on energy costs. In various other examples, the insoluble protein fraction can be dried into a product.

In examples comprising extrusion at step 102 and/or step 108, the extrusion can be performed in a temperature range of 70 degrees Celsius to 200 degrees Celsius, such as, for example, 90 degrees Celsius to 200 degrees Celsius, 110 degrees Celsius to 170 degrees Celsius, 140 degrees Celsius to 170 degrees Celsius, or 140 degrees Celsius to 160 degrees Celsius. In various examples, the extrusion at step 102 can be performed in a temperature range of 140 degrees Celsius to 170 degrees Celsius, and the extrusion at step 108 can be performed in a temperature range of 110 degrees Celsius to 170 degrees Celsius. Extruding at step 102 and/or step 108 can be performed in a pressure range of 10 bar to 80 bar, such as, for example, 20 bar to 60 bar.

In various examples, moisture may be added to the raw material/insoluble protein fraction during extrusion or moisture may not be added. For example, water may be added to the raw material/insoluble protein fraction until the water is 1 percent to 80 percent of the total weight of the resulting wet mixture of water and the raw material/protein fraction, such as, for example, 1 percent to 30 percent, 40 percent to 80 percent, or 20 percent to 50 percent of the total weight of the resulting wet mixture of water and the raw material/protein fraction.

Processing at step 102 and/or processing at step 108 can be performed in the same device or different devices. For example, processing at step 102 and at step 108 can be performed in the same extruder or different extruders. In various examples, steps 102-108 are performed in the same device (e.g., an extruder). The extrusion can occur in a single screw extruder, a twin screw extruder, or an extruder with three or more screws.

In various examples, where the processing at step 108 comprises extrusion, the insoluble protein fraction can be contacted with a cooling section during the processing at step 108. For example, the protein fraction can be cooled to a temperature of no greater than 80 degrees Celsius, such as, for example, no greater than 70 degrees Celsius, no greater than 60 degrees Celsius, or no greater than 40 degrees Celsius. The cooling section can be a portion of a barrel of the extruder or a separate cooling device.

In examples where step 108 comprises an extruder and a cooling section, the processing at step 108 can texturize the protein fraction to achieve a desired texture property, change the tertiary structure of the protein fraction prior to the cooling section and reassemble the protein into larger conglomerates and long fibers in the cooling section. The cooling section can urge the protein fraction into laminar flow and align the structure of the product to desired structure, including a desired porosity and orientation of fibers (e.g., rubbery strand and/or ribbon).

The product can comprise at least one of a meat analog, a crisp, a flour, a pasta, or a spread, or any combination thereof. For example, the product can comprise a meat analog. The product can be suitable for human consumption or may not be suitable for human consumption. In various examples, there may be no need to remove polyphenols or other greening components from a raw material used to make the meat analog, since the meat analog is typically darker in color. Additionally, the polyphenols or other greening component can be an antioxidant, which may be desirable to include in the meat analog for shelf life.

In various examples, the product can comprise 5 percent to 70 percent of protein based on the dry weight of the product, such as, for example, 10 percent to 70 percent of protein, 20 percent to 70 percent of protein, 30 percent to 70 percent protein, 40 percent to 70 percent protein, or 50 percent to 70 percent protein based on the dry weight of the product.

In various examples where the product comprises a meat analog, the meat analog can comprise a hardness of 4,000 Newtons (N) to 32,000 N, such as, for example, 10,000 N to 32,000 N, 15,000 N to 32,000 N, or 20,000 N to 30,000 N. The hardness can be the first hardness or the second hardness or any combinations thereof. In various examples where the product comprises a meat analog, the meat analog can comprise a springiness of 1 mm to 6 mm, such as, for example, 1 mm to 4 mm or 2 mm to 4 mm. In various examples where the product comprises a meat analog, the meat analog can comprise a chewiness of 2 mJ (millijoules) to 60 mJ, such as, for example, a chewiness of 10 mJ to 60 mJ, 20 mJ to 60 mJ, or 30 mJ to 55 mJ. In various examples where the product comprises a meat analog, the meat analog can comprise a gumminess of 2,000 N to 25,000 N, such as, for example, 5,000 N to 25,000 N, 10,000 N to 25,000 N, or 15,000 to 22,500 N. The hardness, springiness, chewiness, and gumminess of the product can be measured according to Texture Profile Analysis (TPA) testing using a Brookfield CT3 4500 Texture Analyzer. Manual No. M08-372-00113 for the Brookfield CT3 4500 Texture Analyzer is hereby incorporated by reference.

TPA testing comprises a 2-cycle compression test (e.g., a two bite test) which can simulate the biting action in a mouth of a consumer. A sample prepared for TPA testing should have a smooth level surface with a diameter smaller than a flat faced cylindrical probe of the testing apparatus (Brookfield CT3 4500 Texture Analyzer). TPA testing performs two compression cycles on the sample and reports five established TPA results. TPA testing can measure the texture of a product by measuring the force and/or energy required to cut (e.g., penetrate), tear, and/or compress (deform) the product. Parameters of texture can be at least one of hardness of the first cycle (e.g., first bite), hardness of the second cycle (e.g., the second bite), adhesion, springiness, cohesiveness, chewiness, or gumminess, or any combination thereof. The first hardness is the peak load of the first compression cycle. The second hardness is the peak load of the second compression cycle.

In various examples, the product can comprise 5 percent to 80 percent of moisture based on the total weight of the product, such as, for example, 10 percent to 70 percent moisture, 15 percent to 50 percent moisture, 20 percent to 60 percent moisture, 60 percent to 70 percent, or 25 percent to 45 percent moisture based on the total weight of the product. The moisture content of the product can be measured by an AND ML-50 moisture analyzer.

In various examples, the product can comprise 1 percent to 20 percent of fat based on the total weight of the product, such as, for example, 1 percent to 15 percent fat, 2 percent to 15 percent fat, 2 percent to 5 percent, 5 percent to 15 percent fat, or 5 percent to 20 percent fat based on the total weight of the product.

In various examples, the product can comprise 3 percent to 38 percent fiber based on the dry weight of the product, such as, for example 10 percent to 35 percent fiber or 15 percent to 35 weight fiber based on the dry weight of the product. For example, the product can comprise at least 3 percent fiber, such as, for example, at least 10 percent fiber or at least 15 percent fiber based on the dry weight of the product.

In various examples the product can be processed into a sunflower protein concentrate. An example of a sunflower protein concentrate is shown in Table 2 below.

TABLE 2

| Example analysis (per 100 g): | | |
|---|---|---|
| Parameter | Value Units | Method |
| Calories | 350 kcal | by calculation |
| Ash | 8.0 g | AOAC: 923.03 Mod |
| Moisture | 8.0 g | By Vacuum Oven, AOAC: 926.08, 927.05 |
| Total Fat | 3.0 g | AOAC: 996.06 Mod |
| Total Carbohydrates | 31.0 g | By Calculation |
| Dietary Fiber | 21.0 g | AOAC: 991.42 Mod |
| Protein | 50.0 G | AACC 46-30 Mod; AOAC 992.15 Mod |

The product can be post-processed by various processing techniques. For example, post-processing techniques can comprise at least one of pasteurization, milling, mixing, grinding, cutting, expanding (e.g., hot oil or hot air), popping, puffing, drying, or coating, or any combination thereof. In various examples, the product can be post-processed into at least one of a textured protein, a patty, a meatball, a frankfurter, a sausage, a minced meat, a nugget, a protein concentrate, or a three-dimensional printed food, or any combination thereof.

Further, the product can be mixed with a supplemental ingredient prior to extrusion at step 108, after extrusion at step 108, or during extrusion at step 108, or any combinations thereof. For example, the product can be mixed with at least one of a starch, a flour, a mineral, a nutrient, a vitamin, water, a fat, a protein (e.g., concentrate, isolate), or a food agent, or any combination thereof. The flour can be at least one of an all-purpose flour, a bread flour, a wheat flour, a rye flour, a spent grain flour, a rice flour, a spelt flour, a barley flour, an oat flour, an amaranth flour, a nut flour, a corn flour, a garbanzo bean flour, a black bean flour, or a pinto bean flour, or any combination thereof. The fat can comprise at least one of oil, butter, or lard, or any combination thereof. The protein can comprise at least one of soy, pea, lupin, rape, chickpea, mung bean, wheat gluten, or corn gluten, or any combination thereof. The starch can comprise at least one of potato starch, a grain starch, a tuber starch, a tapioca starch, or a cassava starch, or any combination thereof. The vitamin can comprise at least one of vitamin A, vitamin C, vitamin D, vitamin E, vitamin K, thiamine, riboflavin, pyridoxine, vitamin B12, niacin, folic acid, pantothenic acid, or biotin, or any combination thereof. The food agent can comprise at least one of a cellulose (e.g., microcrystalline cellulose, methylcellulose), a gum (e.g., xanthan gum, gellan gum, guar gum, locust bean gum, carrageenan), carotenoid, inositol, a spice, a salt, a preservation, natural or artificial flavor, yeast extract, or a colorant (e.g., beet juice extract, caramel), or any combination thereof. The nutrient can comprise ascorbic acid, citric acid, succinic acid, or choline, or any combination thereof. The microcrystalline cellulose can be a gel forming emulsifier that can thicken the product, increase elasticity of the product, retain moisture (e.g., water), and/or act as a fat replacement.

For example, the product can be mixed with a supplemental ingredient to form a composition comprising at least 16 percent of the product based on the total weight of the composition, such as, for example, at least 20 percent of the product, at least 30 percent of the product, at least 40 percent of the product, or at least 50 percent of the product based on the total weight of the composition. In various examples, the product can be mixed with a supplemental ingredient to form a composition comprising no greater than 66 percent of the product based on the total weight of the composition, such as, for example, no greater than 50 percent of the product, no greater than 40 percent of the product, no greater than 30 percent of the product, or no greater than 20 percent of the product based on the total weight of the composition. In certain examples, the product can be mixed with a supplemental ingredient to form a composition comprising a range of 16 percent to 66 percent of the product based on the total weight of the composition, such as, for example, 16 percent to 40 percent of the product, 20 percent to 60 percent of the product, or 30 percent to 60 percent of the product based on the total weight of the composition.

For example, the product can be mixed with a supplemental ingredient to form a composition comprising at least 34 percent of supplemental ingredient based on the total weight of the composition, such as, for example, at least 40 percent of supplemental ingredient, at least 50 percent of supplemental ingredient, at least 60 percent of supplemental ingredient, at least 65 percent of supplemental ingredient, at least 67 percent of supplemental ingredient, at least 70 percent of supplemental ingredient, at least 75 percent of supplemental ingredient, or at least 80 percent of the supplemental ingredient based on the total weight of the composition. In various examples, the product can be mixed with a supplemental ingredient to form a composition comprising no greater than 84 percent of the supplemental ingredient based on the total weight of the composition, such as, for example, no greater than 80 percent of the supplemental ingredient, no greater than 75 percent of the supplemental ingredient, no greater than 70 percent of supplemental ingredient, no greater than 67 percent of supplemental ingredient, no greater than 65 percent of supplemental ingredient, no greater than 60 percent of supplemental ingredient, no greater than 50 percent of supplemental ingredient, or no greater than 40 percent of supplemental ingredient based on the total weight of the composition. In certain examples, the product can be mixed with a supplemental ingredient to form a composition comprising a range of 34 percent to 84 percent of supplemental ingredient based on the total weight of the composition, such as, for example, 67 percent to 84 percent of the supplemental ingredient, 40 percent to 80 percent of the supplemental ingredient, or 40 percent to 70 percent of the supplemental ingredient based on the total weight of the composition.

In various examples, the composition can comprises 5 percent to 70 percent protein based on the dry weight of the composition, such as, for example, 10 percent to 70 percent of protein, 20 percent to 70 percent protein, 30 percent to 70 percent protein, 40 percent to 70 percent protein, or 50 percent to 70 percent protein based on the dry weight of the composition.

In various examples, the composition can comprise 3 percent to 38 percent fiber based on the total dry weight of the composition, such as, for example, 10 percent to 35 percent fiber or 15 percent to 35 percent fiber based on the total dry weight of the composition. For example, the composition can comprise at least 3 percent fiber, such as, for example, at least 10 percent fiber or at least 15 percent fiber based on the total dry weight of the composition.

In various examples, the composition can comprise 5 percent to 30 percent of protein based on the dry weight of the composition; at least 3 percent of fiber based on the dry weight of the composition; 16 percent to 66 percent of a processed material based on the total weight of the composition, wherein the processed material comprises processed oilcake, and 67 percent to 92 percent of a supplemental ingredient based on the total weight of the composition.

The hydrolyzed fraction can be processed into a second product. The second product can comprise at least one of a whey, a drink, a puree, a flour, a sweetener (e.g., glucose-fructose syrup), a powder, an ingredient for spirits manufacturing, or a substrate for microorganisms, or any combination thereof. The second product can be used in various applications, such as, for example, a sweetener in drinks, confectionaries, other food products, or a feed for bacteria, yeast, or other microorganisms, or any combination thereof. The second product can be added to at least one of a pizza, a burger, a sandwich, a meat, a mixed dish, a rice, a pasta (e.g., spaghetti, ramen), a soup, a cooked grain, a bread, a tortilla, a quick bread, a cereal, a nutritional bar, a chip, a cracker, a dessert (e.g., a cookie, a brownie), a candy, a sugar, a vegetable, a beverage, a condiment, a gravy, a spread, a dip, or a dressing, or any combination thereof.

Processing of the hydrolyzed fraction can comprise at least one of homogenization, pasteurization, spray drying, and enzyme deactivation. Enzyme deactivation can comprise at least one of heating, addition of a chemical agent to denature the enzyme, and radiation. If enzyme is used in the hydrolyzing at step 106, residual enzyme in the hydrolyzed fraction can also be inactivated by the pasteurization. In various examples, the hydrolyzed fraction can be homogenized, pasteurized, and processed into a drink and/or a puree. In various other examples, the hydrolyzed fraction can be subject to enzyme deactivation and spray dried and processed into a flour.

In various examples, the water from the hydrolyzed stream can be removed, filtered, and recycled back into the process (e.g., into an extruder, into a bioreactor). This can lower water consumption requirements to process the raw material.

Figure 2:
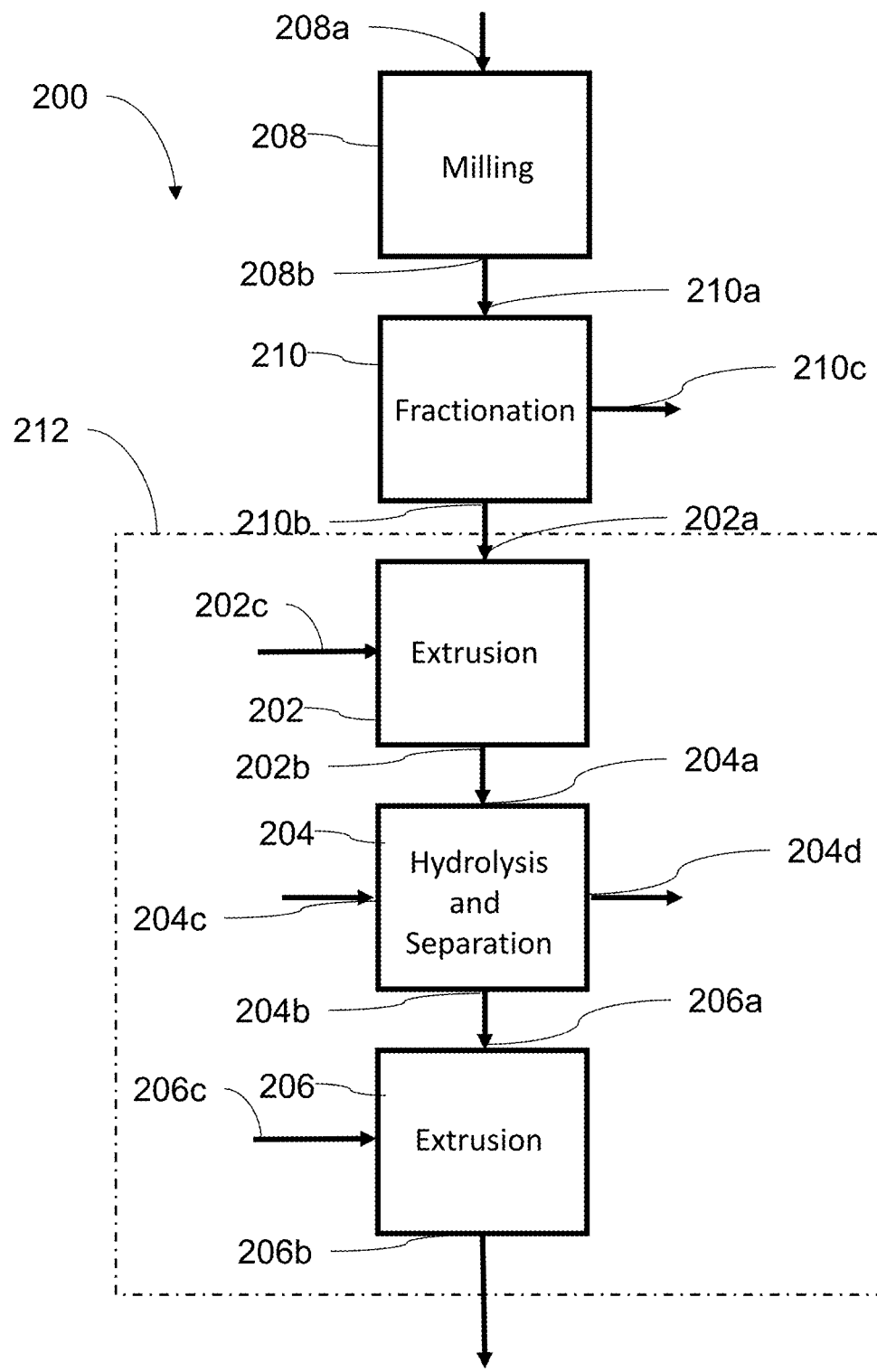
FIG. 2 is a block diagram of a system to process a raw material comprising oilcake to produce a product according to the present disclosure.

Referring to FIG. 2, a system 200 is provided that can process a raw material comprising oilcake into a product. As illustrated, the system 200 comprises a first extruder 202, a bioreactor vessel 204, and a second extruder 206. Optionally, the system 200 can comprise a mill 208 and a fractionator 210. The first extruder 202, bioreactor vessel 204, second extruder 206, mill 208, and fractionator 210 can be in communication with one another such that raw material can be transported throughout the system 200.

The mill 208 can comprise a mill inlet 208a that can be configured to receive raw material inlet stream and can be suitable to transport the raw material to the mill 208. The mill 208 can be configured to grind and/or crush raw material in the raw material inlet stream such that a size of particles of the raw material in the raw material inlet stream is reduced. The resulting milled raw material can leave the mill 208 through the mill outlet 208b in a milled material outlet stream.

The mill outlet 208b can be in communication with a fractionator inlet 210a of the fractionator 210. The fractionator inlet 210a can be configured to receive the milled material outlet stream and transport the milled outlet material stream to the fractionator 210. The fractionator 210 can be configured to separate the raw material in the milled outlet stream into different fractions depending on particle size. For example, the fractionator 210 can produce a first fraction outlet stream and a second fraction outlet stream. The first and second outlet streams can comprise particles of different size. The size of the particles in each stream can be selected based on a desired product.

The first fraction outlet stream can leave the fractionator 210 through the first fractionator outlet 210b and the second fraction outlet stream can leave the fractionator 210 through the second fractionator outlet 210c. The second fractionator outlet 210c can be in communication with a secondary process. In various examples, the first fraction outlet stream can be a high-protein fraction compared to the second fraction outlet stream.

The first fractionator outlet 210b can be in communication with a first extruder inlet 202a of the first extruder 202. The first extruder inlet 202a can be configured to receive the first fraction outlet stream and transport the first fraction outlet stream to the first extruder 202. In various examples, the first extruder 202 can comprise a second extruder inlet 202c configured to receive a secondary extruder inlet stream, which can comprise water and/or a supplemental ingredient. The first extruder 202 can be configured to contact the first fraction outlet stream with the secondary inlet stream and to process the first fraction outlet stream and secondary inlet stream to de-solubilize the protein in the raw material to produce a processed material stream comprising an insoluble protein fraction. The insoluble protein fraction can be water insoluble. The processed material stream can leave the first extruder 202 in through an extruder outlet 202b.

The extruder outlet 202b can be in communication with a first vessel inlet 204a of the bioreactor vessel 204. The first vessel inlet 204a can be configured to receive the processed material stream and transport the processed material stream to the bioreactor vessel 204. In various examples, the bioreactor vessel 204 can also comprise a second vessel inlet configured to receive a secondary vessel inlet stream, which can comprise at least one of enzyme, water, buffer, and a pH adjustment agent. The bioreactor vessel 204 can be configured to contact the secondary inlet stream with the first extruder outlet stream and hydrolyze the first extruder outlet stream, including producing a hydrolyzed fraction stream and an insoluble protein fraction stream.

The insoluble protein fraction stream can leave the bioreactor vessel 204 through the first vessel outlet 204c, and the hydrolyzed fraction stream can leave the bioreactor vessel 204 through a second vessel outlet 204d. In various examples, the bioreactor vessel 204 and/or a separate device can be configured to separate the insoluble protein fraction stream from the hydrolyzed fraction stream. For example, the insoluble protein fraction can be precipitated out of solution in the bioreactor vessel 204. In various examples, a centrifuge and/or decanter can be in communication with the bioreactor vessel 204 to separate the insoluble protein fraction stream from the hydrolyzed fraction stream.

The second vessel outlet 204b can be in communication with a first extruder inlet 206a of the second extruder 206. The first extruder inlet 206a can be configured to receive the insoluble protein fraction stream from the second vessel outlet 204b and transport the insoluble protein fraction stream to the second extruder 206. In various examples, the second extruder 206 can also comprise a second extruder inlet 206c configured to receive a secondary extruder inlet stream which can comprise at least one of water and/or a supplemental ingredient. The second extruder 206 can be configured to process the insoluble protein fraction stream into a product. The product can leave the second extruder 206 through an extruder outlet 206b.

In various examples, the second extruder 206 may not be included, and the protein fraction stream can be dried in a dryer (not shown). In certain examples, the functionality of the first extruder 202, the bioreactor vessel 204, and the second extruder 206 can be embodied in a single device 212, such as, for example, a single extruder. For example, the single extruder 212 can de-solubilize protein in the raw material in a first section to produce a processed material, hydrolyze the processed material in a second section after the first section to produce a mixture comprising the insoluble protein fraction and a hydrolyzed fraction, and process the insoluble protein fraction into a product in a third section after the second section.

Accordingly, methods of manufacturing products from material comprising oilcake, compositions produced from materials comprising processed oilcake, and systems for processing oilcake provided herein can covert high fiber raw materials directly into HMMA, which can provide properties similar to meat while reducing costs. For example, the products formed therefrom can comprise a texture and taste substantially similar to meat. The method and system can minimize protein loss throughout the process. In various examples, the methods and systems provided herein may lose no greater than 20 percent of the protein in the in the raw materials while processing the raw materials into the product, such as, for example, no greater than 16 percent, no greater than 15 percent, no greater than 10 percent, no greater than 9 percent, or no greater than 5 percent of the protein in the raw materials while processing the raw materials into the product. Additionally, the methods of manufacturing nutritional compositions, and products formed therefrom provided herein, may not have a chemical aftertaste (e.g., due to alcohols or acids), may be more economically feasible (e.g., limited reagents, no drying, low protein losses), and may reduce hazardous processing conditions (e.g., may not use alcohol).

EXAMPLES

The present disclosure will be more fully understood by reference to the following examples, which provide illustrative non-limiting aspects of the invention. It is understood that the invention described in this specification is not necessarily limited to the examples described in this section.

Example 1—Fractionating

To pre-process sunflower oilcake, sunflower oilcake was screened into a 20 MESH fraction and thereafter, both the sunflower oilcake was milled into a 100 MESH. Thereafter, the milled sunflower oilcake was fractionated into a first fraction comprising a less than 100 MESH particles and a second fraction comprising at least 100 MESH particles. Thereafter, the protein content of each fraction was measured according to AACC 46-30 and AOAC 992.15.

TABLE 3

Protein content depending on the screening/fractionation

|  | Raw Sunflower Oilcake | ≥100 MESH Particle Fraction | <100 MESH Particle Fraction |
|---|---|---|---|
| Protein Content (Dry weight) | 35 percent | 43.5 percent | 30.74 percent |
| Percent Yield | 100 percent | 33.4 percent | 66.6 percent |

Figure 6:
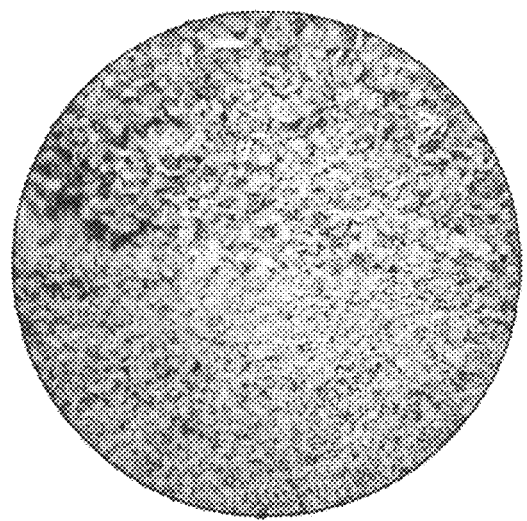
FIG. 6 is an image of two fractions of screened sunflower oilcake prepared according to the present disclosure.

As illustrated in Table 3, fractionation of milled sunflower oilcake can increase the protein content by 24 percent. An image of the first fraction and the second fraction is shown in FIG. 6 with the first fraction on the top and the second fraction on the bottom.

Example 2—De-Solubilizing

Protein in 350 grams of sunflower oilcake (36.1 percent protein based on the dry weight of the sunflower oilcake, 10 percent moisture based on the total weight of the sunflower oil cake) was de-solubilized by extruding the sunflower oilcake in a twin screw extruder. The extrusion was performed at a temperature of 140 degrees Celsius, a pressure of 20 bar, and 5 percent water (based on the total combined weight of the water and sunflower oilcake) was injected into the extruder. The extrusion processed the sunflower oilcake and de-solubilized protein in the sunflower oilcake to produce an extruded material.

Example 3—Bioreactor

An extruded material prepared according to Example 2 was added to a bioreactor at a ratio of 1 part extruded material: 6 parts water and stirred for 1 hour at 25 degrees Celsius to hydrolyze the sunflower oilcake into a mixture comprising an insoluble protein fraction and a hydrolyzed fraction. The hydrolyzed fraction was separated from the insoluble protein fraction by precipitation. The insoluble protein fraction weighed 588 g and was measured to contain 63.7 percent moisture.

Example 4—Processing into a HMMA

An insoluble protein fraction prepared according to Example 3 was subjected to a second extrusion at a temperature of 151 degrees Celsius and a pressure 20 bar. No water was added during the second extrusion. The second extrusion resulted in a HMMA weighing 522 g and comprising 38.38 percent protein based on the dry weight of the HMMA and 52.5 percent moisture based on the total weight of the HMMA. The protein lost from processing the sunflower oilcake into the HMMA was 18.5 g (16.29 percent based on the total weight of the protein in the sunflower oilcake), which is an improvement over prior processes.

Example 5—Processing into a Protein Concentrate

Figure 7:
FIG. 7 is an image of a protein concentrate prepared according to the present disclosure.

An insoluble protein fraction prepared according to Example 3 was dried at a temperature of 60 degrees Celsius to reduce the moisture content to form a protein concentrate comprising 4.3 weight moisture based on the total weight of the protein concentrate. The protein concentrate weighed 223 g and had 44.6 percent protein based on the dry weight of the protein concentrate. The protein lost from processing the sunflower oilcake into the protein concentrated was 18.5 g (16.29 percent based on the total weight of the protein in the sunflower oilcake), which is an improvement over prior processes. A sample of the protein concentration of Example 5 is pictured in FIG. 7.

Example 6—Acid Treatment

An extruded material prepared according to Example 2 was treated with 2 liters of 7 percent Succinic Acid to form a ratio of 1 part extruded material: 6 parts liquid and allowed to contact for 1 hour at 25 degrees Celsius to form a processed material comprising an insoluble protein fraction and a second hydrolysate fraction. An insoluble protein fraction was precipitated to separate the insoluble protein fraction from a first hydrolysate fraction. The precipitated insoluble protein fraction was washed with water at ratio 1 part extruded material: 6 parts water. The precipitated insoluble protein fraction was separated from the second hydrolysate fraction. The insoluble protein fraction weighed 645 g.

The precipitated insoluble protein fraction was subjected to enzymatic hydrolysis (mixture of cellulase and endoglucanase, mutual activity of 25 u/g, Oilcake/Water ratio 1:3.7, at 55° C., pH 4.7) for 4 hours to produce a mixture. A third hydrolysate stream was separated from the mixture and the resulting insoluble protein fraction weighed 588 g and had a 60.74 percent moisture based on the total weight of the insoluble protein fraction.

Example 7—Processing into a HMMA

Figure 3A:
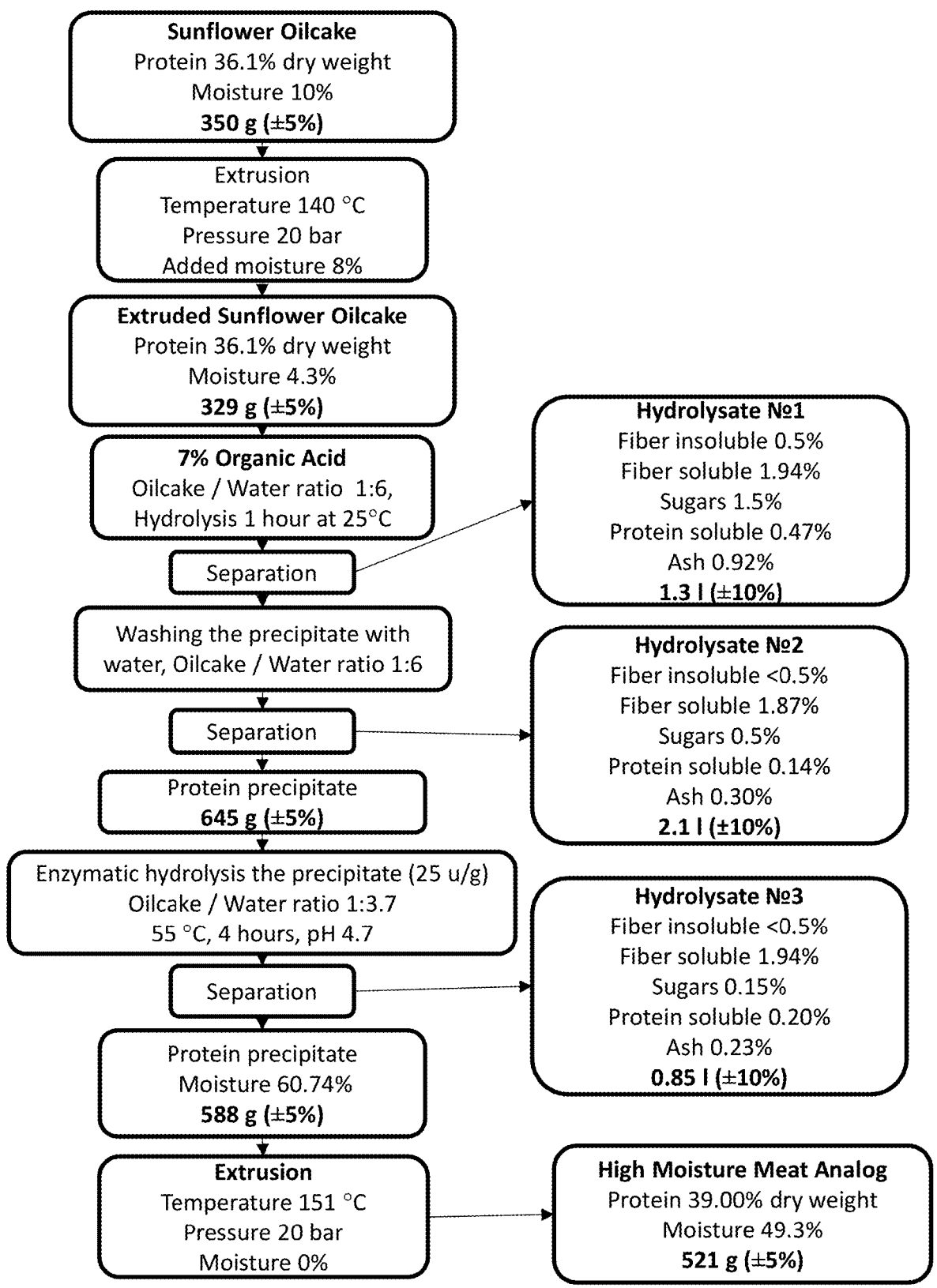
FIG. 3A is a process flow diagram of a method to process a raw material comprising oilcake to produce a product according to Example 7 of the present disclosure.

A resulting insoluble protein fraction prepared according to Example 6 was subjected to a second extrusion. The extrusion was performed at a temperature of 151 degrees Celsius, a pressure of 20 bar, and no added water, which resulted in a HMMA weighing 521 g and comprising 39.0 percent protein based on the dry weight of the HMMA and 49.3 percent moisture based on the total weight of the HMMA. The protein lost from processing the sunflower oilcake into the HMMA was 10.75 g (9.45 percent based on the total weight of the protein in the sunflower oilcake), which is an improvement over prior processes. A process flow diagram for Example 7 is provided in FIG. 3A. A sample of Example 7 had a similar appearance to the sample in the middle of FIG. 4B.

Example 8—Processing into a Protein Concentrate

Figure 3B:
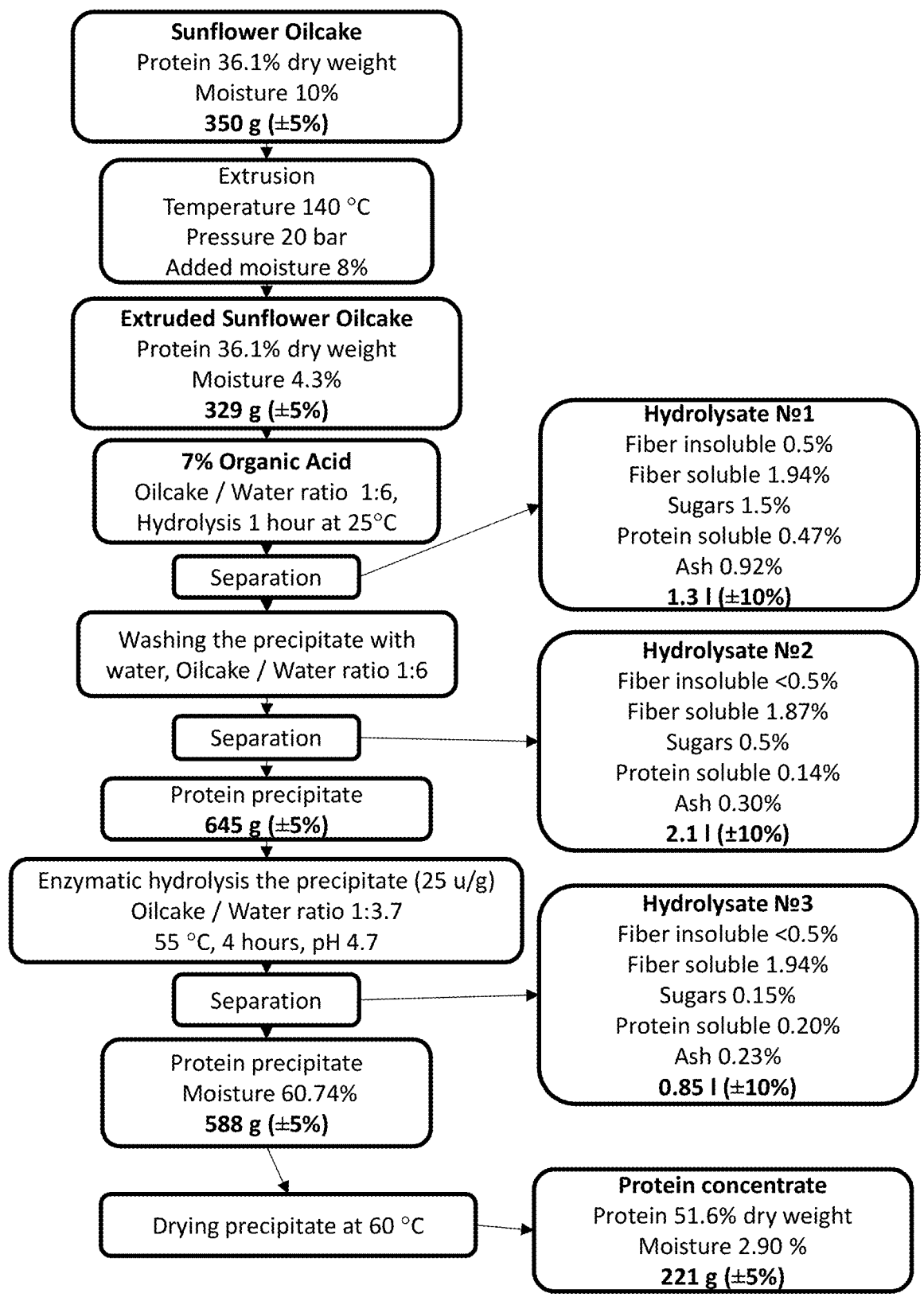
FIG. 3B is a mass balance diagram of a method to process a raw material comprising oilcake to produce a product according to Example 8 of the present disclosure.

A resulting insoluble protein fraction prepared according to Example 6 was dried at temperature 60 degrees Celsius and resulting in protein concentrate weighing 221 g and comprising 51.6 percent protein based on the dry weight of the protein concentrate and 2.90 percent moisture based on the total weight of the protein concentrate. The protein lost from processing the sunflower oilcake into the protein concentrate was 10.75 g (9.45 percent based on the total weight of the protein in the sunflower oilcake), which is an improvement over prior processes. A process flow diagram for Example 8 is provided in FIG. 3B. A sample of Example 8 had a similar appearance to Example 5.

Example 9—Texture, Moisture, and Taste

Various meat analogs were prepared and measured for texture, moisture, and taste. HMMA #1 was prepared utilizing soy isolate comprising 90 percent protein based on the dry weight of the sunflower oilcake according to "Next Generation Texturized Vegetable Proteins" by Brugger et al. Food Marketing & Technology April 2017. HMMA #2 was prepared utilizing raw, unprocessed sunflower oilcake which contained 35 percent protein by dry weight of the raw, unprocessed sunflower oilcake and 13 percent moisture by total weight of the raw, unprocessed sunflower oilcake according to Canadian Patent No. 968214A to Jenkins et al and then hydrated with excessive hot water. HMMA #3 was prepared according to Example 4. The texture of each HMMA was measured utilizing standard Texture Profile Analysis testing using a Brookfield CT3 4500 Texture Analyzer. Namely, cubical samples (5 mm×5 mm×5 mm) were prepared and subjected to compression by the Brookfield CT3 Texture Analyzer with the trigger value at 10.0 g, target deformation at 2.0 mm and the test speed at 2.0 mm/s using the TPA menu screen. Results were calculated by TexturePro CT software. The moisture content of each HMMA was measured by AND ML-50 moisture analyzer. The taste of each HMMA was evaluated by a panel of 5 experts using a scale from 1 to 10 (1 being the lowest, e.g., strong beany aftertaste; 10 being the highest, e.g., minimal beany aftertaste). The results of the texture, moisture, and taste measurements for each HMMA are provided in Table 4 below.

TABLE 4

Texture, moisture, and taste of various meat analogs.

|  | HMMA #1 | HMMA #2 | HMMA #3 |
|---|---|---|---|
| Hardness First Cycle (N) | 31,406 | 319 | 28,863 |
| Hardness Second Cycle (N) | 28,185 | 233 | 29,213 |
| Springiness (mm) | 2.26 | 2.33 | 5.94 |
| Gumminess (N) | 22,737 | 85 | 24,301 |
| Chewiness (mJ) | 51.35 | 0.22 | 54.04 |
| Moisture (percent) | 49 | 63 | 54.5 |
| Taste (1-10) | 10 | 1 | 10 |

Figure 4A:
FIG. 4A is an image of high moisture meat analog #2 according to Example 9 of the present disclosure.
Figure 4B:
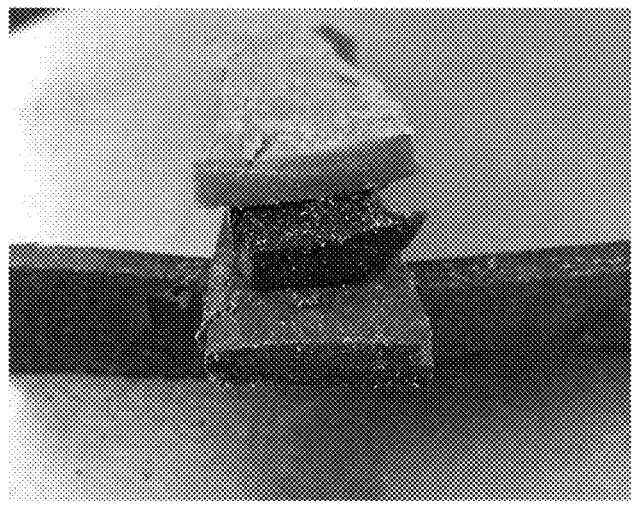
FIG. 4B is an image of high moisture meat analogs according to Example 9 of the present disclosure.

The results of Table 4 illustrates that HMMA #3 achieves a more desirable texture and taste compared to HMMA #2 and HMMA #3 is also cheaper to produce than HMMA #1. An image of the HMMA #2 in Table 4 is provided in FIG. 4A. Additionally, FIG. 4B illustrates a sample of the HMMA #1 on the top, a sample of a 50/50 w/w blend of HMMA #1 and HMMA #2 in the middle, and a sample of HMMA #3 on the bottom. As shown in FIG. 4B, HMMA #3 has a more desirable color for a beef substitute than HMMA #1.

Example 10—Burger Patties

A first burger patty was prepared from an HMMA prepared according to Example 4 and a second burger patty was prepared from an HMMA prepared according to Example 7. Each burger patty was prepared according to the recipe in Table 5 below.

TABLE 5

Burger patty recipe for 6-8 servings

| Ingredient | Amount (g) |
|---|---|
| White or brown rice (cooked) | 300 |
| HMMA | 580 |
| Coconut oil (solid and chilled, not melted) | 27 |
| Sunflower oil | 27 |
| Potato starch flour | 40 |
| Salt | 36 |
| Beet juice | 30 |
| Black pepper | 2.3 |
| Garlic powder | 3.1 |
| Onion powder | 2.4 |
| Liquid smoke | 4.5 |

Figure 5A:
FIG. 5A is an image of a first burger patty according to Example 10 of the present disclosure.
Figure 5B:
FIG. 5B is an image of a second burger patty according to Example 10 of the present disclosure.

All of the ingredients in Table 5 were combined together and mixed for each burger patty. Thereafter, a burger patty was formed from each resulting mixture. After forming, each burger patty was fried for 2 minutes on each side. FIG. 5A illustrates an image of the first burger patty after frying and FIG. 5B illustrates an image of the second burger patty after frying. Additionally, it was determined that the first and second burger patties had a desirable taste and texture.

Accordingly, the examples herein show reduced protein losses from the raw material (e.g., raw, unprocessed sunflower oilcake) and a high-protein product. It is believed that other methods according to the present disclosure can also achieve the results according to the Examples herein.

The costs of processing sunflower oilcake into a protein fraction suitable for HMMA can be reduced down to $0.20/kg of insoluble protein fraction and the cost of processing sunflower oilcake into a sunflower protein concentration comprising 50 percent protein based on the dry weight of the sunflower protein concentrate can be reduced to $0.40/kg of sunflower protein concentrate. Additionally, combining the process of de-solubilizing the protein and processing the insoluble protein fraction into a HMMA in the same extruder can further reduce costs (e.g., $1/kg of HMMA). Additionally, the use of a wet, insoluble protein fraction can eliminate a drying step, which can be costly during manufacture.

Various aspects of the invention according to the present disclosure include, but are not limited to, the aspects listed in the following numbered clauses.
  1. A method comprising:
    de-solubilizing protein in a material comprising oilcake to produce a processed material comprising an insoluble protein fraction;

hydrolyzing the processed material to produce a mixture comprising the insoluble protein fraction and a hydrolyzed fraction;

separating the insoluble protein fraction from the hydrolyzed fraction; and processing the insoluble protein fraction into a product.

2. The method of clause 1, wherein the material further comprises at least one of a distiller grain, pulp, a pomace, a legume, a mushroom, or microbial protein, or any combination thereof 3. The method of any one of clauses 1-2, wherein the oilcake comprises at least one of a sunflower oilcake, a soybean oilcake, a cottonseed oilcake, a rapeseed oilcake, a canola oilcake, a copra oilcake, a palm kernel oilcake, a peanut oilcake, an olive oilcake, or a locust bean cake, or any combination thereof.

4. The method of any one of clauses 1-3, wherein the oilcake comprises sunflower oilcake.

5. The method of any one of clauses 1-4, wherein the oilcake comprises 25 percent to 60 percent of protein based on the dry weight of the material.

6. The method of any one of clauses 1-5, wherein the product is a meat-analog.

7. The method of any one of clauses 1-6, wherein processing the material comprises at least one of extruding the material, toasting the material, drying the material, adding salt to the material, or adjusting the pH of the material, or any combination thereof 8. The method of any one of clauses 1-7, wherein processing the material, processing the protein fraction, or combinations thereof, comprises extruding.

9. The method of clause 8, further comprising extruding the material or the insoluble protein fraction in a temperature range of 70 degrees Celsius to 200 degrees Celsius and a pressure range of 10 bar to 80 bar.

10. The method of clause 9, wherein extruding the protein fraction comprises adjusting a moisture content of the protein fraction to be in a range of 40 percent to 80 percent of moisture based on the total weight of the protein fraction.

11. The method of any one of clauses 1-10, wherein de-solubilizing protein in the material and processing the protein fraction are performed in the same extruder.

12. The method of any one of clauses 1-10, wherein de-solubilizing protein in the material and processing the protein fraction are performed in different extruders.

13. The method of any one of clauses 1-12, further comprising contacting the protein fraction with a cooled section of a barrel of an extruder during processing.

14. The method of any one of clauses 1-13, wherein hydrolyzing comprises at least one of adding enzyme and adding an acid.

15. The method of any one of clauses 1-14, wherein hydrolyzing comprises adding enzyme.

16. The method of clause 15, wherein the enzyme comprises at least one of cellulase, alpha-galactosidase, xylanase, glucanase, amylase, liginase, transglutaminase, endoglucanase, or hemicellulose, or any combination thereof.

17. The method of any one of clauses 1-16, wherein separating comprises at least one of centrifuging the mixture, decanting the mixture, or precipitating the protein fraction from the mixture, or any combination thereof 18. The method of clause 17, wherein precipitating the protein fraction comprises adjusting a pH of the mixture.

19. The method of any one of clauses 1-18, wherein processing the insoluble protein fraction comprising fractionating.

20. The method of any one of clauses 1-19, further comprising processing the hydrolyzed fraction into a second product.

21. The method of clause 20, wherein the second product is at least one of a whey, drink, a puree, a flour, a sweetener, powder, an ingredient for spirits manufacturing, or a substrate for microorganisms, or any combination thereof.

22. The method of any one of clauses 1-21, further comprising mixing the product with at least one of a starch, a flour, a mineral, a vitamin, water, oil, protein, or a food agent, or any combination thereof.

23. A meat analog comprising:
   10 percent to 70 percent of protein based on the dry weight of the metal analog;
   a hardness of 4,000 N to 32,000 N; and
   5 percent to 50 percent of moisture based on the total weight of the meat analog;
   wherein the meat analog is produced by processing a material comprising oilcake.

24. The meat analog of clause 23, wherein the material further comprises at least one of a distiller grain, pulp, a pomace, a legume, a mushroom, or microbial protein, or any combination thereof.

25. The meat analog of any one of clauses 23-24, wherein the oilcake comprises at least one of a sunflower oilcake, a soybean oilcake, a cottonseed oilcake, a rapeseed oilcake, a canola oilcake, a copra oilcake, a palm kernel oilcake, a peanut oilcake, olive oilcake, or locust bean cake, or any combination thereof.

26. The meat analog of any one of clauses 23-25, wherein the oilcake comprises sunflower oilcake.

27. The meat analog of any one of clauses 23-26, wherein the meat analog comprises
   a chewiness of 2 mJ to 60 mJ;
   a springiness of 1 mm to 6 mm; and
   a gumminess of 2,000 N to 25,000 N 28. The meat analog of any one of clauses 23-27, wherein the meat analog further comprises 6 percent to 38 percent of fiber based on the dry weight of the meat analog.

29. A composition comprising:
   5 percent to 30 percent of protein based on the dry weight of the composition;
   at least 3 percent of fiber based on the dry weight of the composition;
   16 percent to 66 percent of a processed material based on the total weight of the composition, wherein the processed material comprises processed oilcake; and
   67 percent to 92 percent of a supplemental ingredient based on the total weight of the composition.

30. The composition of clause 29, wherein the material further comprises at least one of a distiller grain, pulp, a pomace, a legume, a mushroom, or microbial protein, or any combination thereof.

31. The composition of any one of clauses 29-30, wherein the oilcake comprises at least one of a sunflower oilcake, a soybean oilcake, a cottonseed oilcake, a rapeseed oilcake, a canola oilcake, a copra oilcake, a palm kernel oilcake, a peanut oilcake, olive oilcake, or locust bean cake, or any combination thereof.

32. The composition of any one of clauses 29-31, wherein the oilcake comprises sunflower oilcake.
33. The composition of any one of clauses 29-32, wherein the supplemental ingredient comprises at least one of a starch, a flour, a mineral, a nutrient, a vitamin, water, fat, protein, or a food agent, or any combination thereof.
34. At least one of a pizza, a burger, a sandwich, a meat, a mixed dish, a rice, a pasta, a soup, a cooked grain, a bread, a tortilla, a quick bread, a cereal, a bar, a chip, a cracker, a dessert, a candy, a sugar, a vegetable, a beverage, a condiment, a gravy, a spread, or a dressing, or any combination thereof, comprising the composition of any one of clauses 29-33.
35. At least one of a pizza, a burger, a sandwich, a meat, a mixed dish, a rice, a pasta, a soup, a cooked grain, a bread, a tortilla, a quick bread, a cereal, a bar, a chip, a cracker, a dessert, a candy, a sugar, a vegetable, a beverage, a condiment, a gravy, a spread, or a dressing, or any combination thereof, comprising a composition produced by mixing a product produced by any one of clauses 1-22 with at least one of a starch, a flour, a mineral, a vitamin, water, oil, protein, or a food agent, or any combination thereof.
35. A product, a composition, or any combinations thereof, produced by the method of any one of clauses 1-22.

One skilled in the art will recognize that the herein described methods, processes, systems, apparatus, components, devices, operations/actions, and objects, and the discussion accompanying them, are used as examples for the sake of conceptual clarity and that various configuration modifications are contemplated. Consequently, as used herein, the specific examples/embodiments set forth and the accompanying discussions are intended to be representative of their more general classes. In general, use of any specific exemplar is intended to be representative of its class, and the non-inclusion of specific components, devices, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

What is claimed is:

1. A method comprising:
   de-solubilizing protein in a first material comprising oilcake to produce a processed material comprising an insoluble protein fraction by extruding the first material in a pressure range of 10 bar to 80 bar;
   hydrolyzing the processed material to produce a mixture comprising the insoluble protein fraction and a hydrolyzed fraction;
   separating the insoluble protein fraction from the hydrolyzed fraction; and
   processing the insoluble protein fraction into a product by extruding the insoluble protein fraction in a pressure range of 10 bar to 80 bar.

2. The method of claim 1, wherein the first material further comprises at least one of a distiller grain, pulp, a pomace, a legume, a mushroom, or microbial protein, or any combination thereof.
3. The method of claim 1, wherein the oilcake comprises at least one of a sunflower oilcake, a soybean oilcake, a cottonseed oilcake, a rapeseed oilcake, a canola oilcake, a copra oilcake, a palm kernel oilcake, a peanut oilcake, an olive oilcake, or a locust bean cake, or any combination thereof.
4. The method of claim 1, wherein the oilcake comprises sunflower oilcake.
5. The method of claim 1, wherein the product is a meat-analog.
6. The method of claim 1, further comprising at least one of toasting the first material, drying the first material, adding salt to the first material, or adjusting the pH of the first material, or any combination thereof.
7. The method of claim 1, further comprising extruding the first material or the insoluble protein fraction in a temperature range of 70 degrees Celsius to 200 degrees Celsius.
8. The method of claim 7, wherein extruding the insoluble protein fraction comprises adjusting a moisture content of the insoluble protein fraction to be in a range of 40 percent to 80 percent of moisture based on the total weight of the insoluble protein fraction.
9. The method of claim 1, wherein de-solubilizing protein in the first material and processing the insoluble protein fraction are performed in the same extruder.
10. The method of claim 1, wherein de-solubilizing protein in the first material and processing the insoluble protein fraction are performed in different extruders.
11. The method of claim 1, further comprising contacting the protein fraction with a cooled section of a barrel of an extruder during processing.
12. The method of claim 1, wherein hydrolyzing comprises at least one of adding enzyme and adding an acid.
13. The method of claim 1, wherein hydrolyzing comprises adding enzyme.
14. The method of claim 13, wherein the enzyme comprises at least one of cellulase, alpha-galactosidase, xylanase, glucanase, amylase, liginase, transglutaminase, endoglucanase, or hemicellulase, or any combination thereof.
15. The method of claim 1, wherein separating comprises at least one of centrifuging the mixture, decanting the mixture, or precipitating the protein fraction from the mixture, or any combination thereof.
16. The method of claim 1, wherein processing the insoluble protein fraction comprising fractionating.
17. The method of claim 1, further comprising mixing the product with at least one of a starch, a flour, a mineral, a vitamin, water, oil, protein, or a food agent, or any combination thereof.
18. The method of claim 1, further comprising adding water to the mixture at a ratio in a range of 1 part of mixture: 6 parts of water to 1 part of mixture: 2 parts of water.

* * * * *